(12) United States Patent
Kishimoto et al.

(10) Patent No.: US 6,644,135 B1
(45) Date of Patent: Nov. 11, 2003

(54) TORQUE SENSOR FOR A BICYCLE BOTTOM BRACKET ASSEMBLY

(75) Inventors: Hitoshi Kishimoto, Sakai (JP); Kazuhiro Fujii, Kawachinagano (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/387,353

(22) Filed: Aug. 31, 1999

(30) Foreign Application Priority Data

Sep. 1, 1998 (JP) ............................................. 10-247227
Jan. 29, 1999 (JP) ............................................. 11-021215

(51) Int. Cl.$^7$ ................................................. G01L 3/14
(52) U.S. Cl. ................................................. 73/862.338
(58) Field of Search ........................ 73/862.08, 862.12, 73/862.328–862.333, 862.334, 862.338; 80/233, 206, 282

(56) References Cited

U.S. PATENT DOCUMENTS

| | | | | |
|---|---|---|---|---|
| 4,186,596 A | * | 2/1980 | Bohringer et al. | 73/862.338 |
| 5,542,304 A | * | 8/1996 | Sasada et al. | 73/862.333 |
| 5,570,752 A | * | 11/1996 | Takata | 180/206 |
| 5,799,748 A | * | 9/1998 | Origuchi | 180/233 |
| 6,152,252 A | * | 11/2000 | Pettersson | 180/282 |
| 6,260,422 B1 | * | 7/2001 | Odachi et al. | 73/862.334 |
| 6,269,702 B1 | * | 8/2001 | Lambson | 73/862.045 |

FOREIGN PATENT DOCUMENTS

| | | |
|---|---|---|
| EP | 636537 A1 | 2/1995 |
| EP | 675037 A1 | 10/1995 |

OTHER PUBLICATIONS

Patent Abstracts of Japan, vol. 1997, No. 12, dated Dec. 25, 1997 for JP 9–207868, dated Aug. 12, 1997.

* cited by examiner

*Primary Examiner*—Edward Lefkowitz
*Assistant Examiner*—Jewel V. Thompson
(74) *Attorney, Agent, or Firm*—James A. Deland

(57) ABSTRACT

A torque sensor for a bicycle bottom bracket assembly having a bottom bracket axle includes an axle supporting member for supporting the axle for rotation around a support axis. The axle supporting member has a first sensor mounting location, and a first pressure sensor is provided for placement at the first sensor mounting location. In a more specific embodiment, the axle supporting member includes a second sensor mounting location and a second pressure sensor is provided for placement at the second sensor mounting location. The second sensor mounting location may be spaced apart from the first sensor mounting location in the direction of the support axis. In this case the second sensor mounting location may face the first sensor mounting location in the direction of the support axis or may be disposed diagonally across from the first sensor mounting location in the direction of the support axis. Alternatively, the second sensor mounting location may face the first sensor mounting location in the radial direction of the axle supporting member.

74 Claims, 16 Drawing Sheets

TORQUE SENSOR FOR A BICYCLE BOTTOM BRACKET ASSEMBLY

BACKGROUND OF THE INVENTION

The present invention is directed to bicycles and, more particularly, to a torque sensor for a bicycle bottom bracket assembly.

In power-assisted bikes, which are bicycles in which an electric motor is used as auxiliary motive power, the auxiliary motive power is delivered in accordance with drive torque. Consequently, such power-assisted bikes are provided with torque sensors for sensing the drive torque. These sensors are installed, for example, in the bottom bracket axle assembly (which supports the pedals and crank arms) as shown in Japanese Unexamined Patent Applications (Kokai) 8-297059 and 8-313375. Such torque sensors are used not only for controlling the motor output of power-assisted bikes but also for controlling the shift timing of automatic shifting devices, for example.

The torque sensor disclosed in the first document comprises a drive shell fixedly fitted over the bottom bracket axle and provided with a chainwheel at one end, a magnetic material applied to the drive shell, and a coil unit mounted around the outside of the magnetic material of the bottom bracket. In such a torque sensor, the magnetic material develops a strain proportional to the torque when torsional force is generated by the rotation of the cranks. When strain is created in the magnetic material, the magnetic permeability of this material varies in accordance with the strain, thus changing the voltage of the coil unit. The torque is sensed based on the changes in this voltage.

Since this torque sensor senses a torque that varies with the strain of the magnetic material, it requires complex electrical circuitry for sensing very small strains. Additionally, the accuracy with which the magnetic material or the coil unit is mounted must be kept at a high level in order to measure such small strains. The sensor is therefore difficult to mount. Furthermore, the need to mount a coil unit in the bottom bracket makes it impossible to mount a bottom bracket axle assembly having a torque sensor in the bottom bracket of a standardized bicycle and fails to provide interchangeability with commercially available bottom bracket axle assemblies.

The torque sensor disclosed in the second document comprises a follower disk that rotates integrally with the chainwheel and that is rotatably mounted on the bottom bracket axle, a drive disk that rotates together with the bottom bracket axle, a spring plate for connecting the two disks, and a proximity switch facing the two disks and designed to sense the phase difference between the two disks. With such a torque sensor, the rotation of the cranks is transmitted to the chainwheel via the bottom bracket axle, drive disk, spring plate, and follower disk.

Unfortunately, this torque sensor requires that two disks be provided around the bottom bracket axle and that a proximity switch be installed facing these disks, thus complicating the structure of the bottom bracket axle assembly and increasing its radial dimensions. This, in turn, requires a larger bottom bracket on the bicycle. Thus, a bottom bracket axle assembly having this torque sensor cannot be mounted on the bottom bracket of a standardized bicycle, and it is impossible to provide interchangeability with commercially available bottom bracket axle assemblies.

SUMMARY OF THE INVENTION

The present invention is directed to a torque sensor for a bicycle bottom bracket assembly that has a compact structure, is easy to install, and which may be used with existing and commercially available bottom brackets. In one embodiment of the present invention, a torque sensor for a bicycle bottom bracket assembly having a bottom bracket axle includes an axle supporting member for supporting the axle for rotation around a support axis. The axle supporting member has a first sensor mounting location, and a first pressure sensor is provided for placement at the first sensor mounting location. In a more specific embodiment, the axle supporting member includes a second sensor mounting location and a second pressure sensor is provided for placement at the second sensor mounting location. The second sensor mounting location may be spaced apart from the first sensor mounting location in the direction of the support axis. In this case the second sensor mounting location may face the first sensor mounting location in the direction of the support axis or may be disposed diagonally across from the first sensor mounting location in the direction of the support axis. Alternatively, the second sensor mounting location may face the first sensor mounting location in the radial direction of the axle supporting member.

In an even more specific embodiment, the axle supporting member may include a second sensor mounting location spaced apart from the first sensor mounting location in the direction of the support axis, a third sensor mounting location spaced apart from the first sensor mounting location in a radial direction of the axle supporting member, and a fourth sensor mounting location spaced apart from the third sensor mounting location in the direction of the support axis. A second pressure sensor may be provided for placement at the second sensor mounting location, a third pressure sensor may be provided for placement at the third sensor mounting location, and a fourth pressure sensor may be provided for placement at the fourth sensor mounting location. If desired, the second sensor mounting location may face the first sensor mounting location in the direction of the support axis, the fourth sensor mounting location may face the third sensor mounting location in the direction of the support axis, the third sensor mounting location may face the first sensor mounting location in the radial direction of the axle supporting member, and the fourth sensor mounting location may face the second sensor mounting location in the radial direction of the axle supporting member.

In a more specific embodiment of the invention directed to a more complete portion of the bottom bracket assembly, a torque sensor for the bicycle bottom bracket assembly includes an axle having an axle axis, a first bearing including a plurality of first rollers disposed on the axle, and a second bearing including a plurality of second rollers disposed on the axle. The first bearing is spaced apart from the second bearing in the direction of the axle axis. A tubular bearing housing surrounds the axle so that the first bearing and the second bearing are disposed between the axle and the bearing housing and so that the axle is rotatably supported in the bearing housing. A first tubular member is disposed at a first end of the bearing housing, and a second tubular member is disposed at a second end of the bearing housing. A first pressure sensor is disposed between the first tubular member and the bearing housing.

If desired, a second pressure sensor may be disposed between the second tubular member and the bearing housing. More specifically, the first tubular member may be disposed about an outer peripheral surface of the bearing housing, and the second tubular member may be disposed about the outer peripheral surface of the bearing housing. In such a case the first pressure sensor may be disposed between an inner peripheral surface of the first tubular member and the outer peripheral surface of the bearing housing, and the second pressure sensor may be disposed between an inner peripheral surface of the second tubular member and the outer peripheral surface of the bearing housing. The second pressure sensor may be located diagonally across from the first pressure sensor in the direction of the axle axis, or else the second pressure sensor can face the first pressure sensor in the direction of the axle axis.

In a further embodiment of this type, a third pressure sensor may be disposed between the inner peripheral surface of the first tubular member and the outer peripheral surface of the bearing housing, and a fourth pressure sensor may be disposed between the inner peripheral surface of the second tubular member and the outer peripheral surface of the bearing housing. The third pressure sensor may face the first pressure sensor in a radial direction of the bearing housing, and the fourth pressure sensor may face the second pressure sensor in the radial direction of the bearing housing.

In an even further embodiment of the present invention, a first sensor mounting member having a first sensor mounting location may be provided, wherein the first sensor mounting member is disposed between the bearing housing and the first tubular member. In this case the first pressure sensor is disposed at the first sensor mounting location. If the first pressure sensor is disposed radially outwardly of the first sensor mounting member, then a first sensor pressing member may be disposed between the first pressure sensor and the first tubular member. As with the above embodiments, a second sensor mounting member having a second sensor mounting location may be provided, wherein the second sensor mounting member is disposed between the bearing housing and the second tubular member. In this case the first pressure sensor may be located diagonally across from the second pressure sensor in the direction of the axle axis. If the first pressure sensor is disposed radially outwardly of the first sensor mounting member and the second pressure sensor is disposed radially outwardly of the second sensor mounting member, then a first sensor pressing member may be disposed between the first pressure sensor and the first tubular member, and a second sensor pressing member may be disposed between the second pressure sensor and the second tubular member.

If desired, the first sensor mounting member and the second sensor mounting member each may have an outer peripheral surface in a shape of an octagon, and the first sensor pressing member and the second sensor pressing member each may have an inner peripheral surface in a shape of an octagon. A first flat side of the first sensor mounting member faces the first pressure sensor, and a second flat side of the second sensor mounting member faces the second pressure sensor. Two flanking sides of the outer peripheral surface of the first sensor mounting member adjacent to and flanking the first flat side may be spaced apart from the inner peripheral surface of the first sensor pressing member, and two diametrically opposite spaced sides of the outer peripheral surface of the first sensor mounting member diametrically opposite the two flanking sides of the first sensor mounting member may be spaced apart from the inner peripheral surface of the first sensor pressing member. Similarly, two flanking sides of the outer peripheral surface of the second sensor mounting member adjacent to and flanking the second flat side may be spaced apart from the inner peripheral surface of the second sensor pressing member, and two diametrically opposite spaced sides of the outer peripheral surface of the second sensor mounting member diametrically opposite the two flanking sides of the second mounting member may be spaced apart from the inner peripheral surface of the second sensor pressing member. Additionally, two diametrically opposite sides of the outer peripheral surface of the first sensor mounting member between the two flanking sides of the first sensor mounting member and the two diametrically opposite spaced sides of the first sensor mounting member may contact the inner peripheral surface of the first sensor pressing member, and two diametrically opposite sides of the outer peripheral surface of the second sensor mounting member between the two flanking sides of the second sensor mounting member and the two diametrically opposite spaced sides of the second sensor mounting member may contact the inner peripheral surface of the second sensor pressing member.

In yet another embodiment, the first sensor pressing member may have a curved outer peripheral surface facing an inner peripheral surface of the first tubular member. Such a curved surface helps to distribute the pressure exerted between the first tubular member and the sensor pressing member evenly to the pressure sensor.

DETAILED DESCRIPTION OF THE EMBODIMENTS

Figure 1:
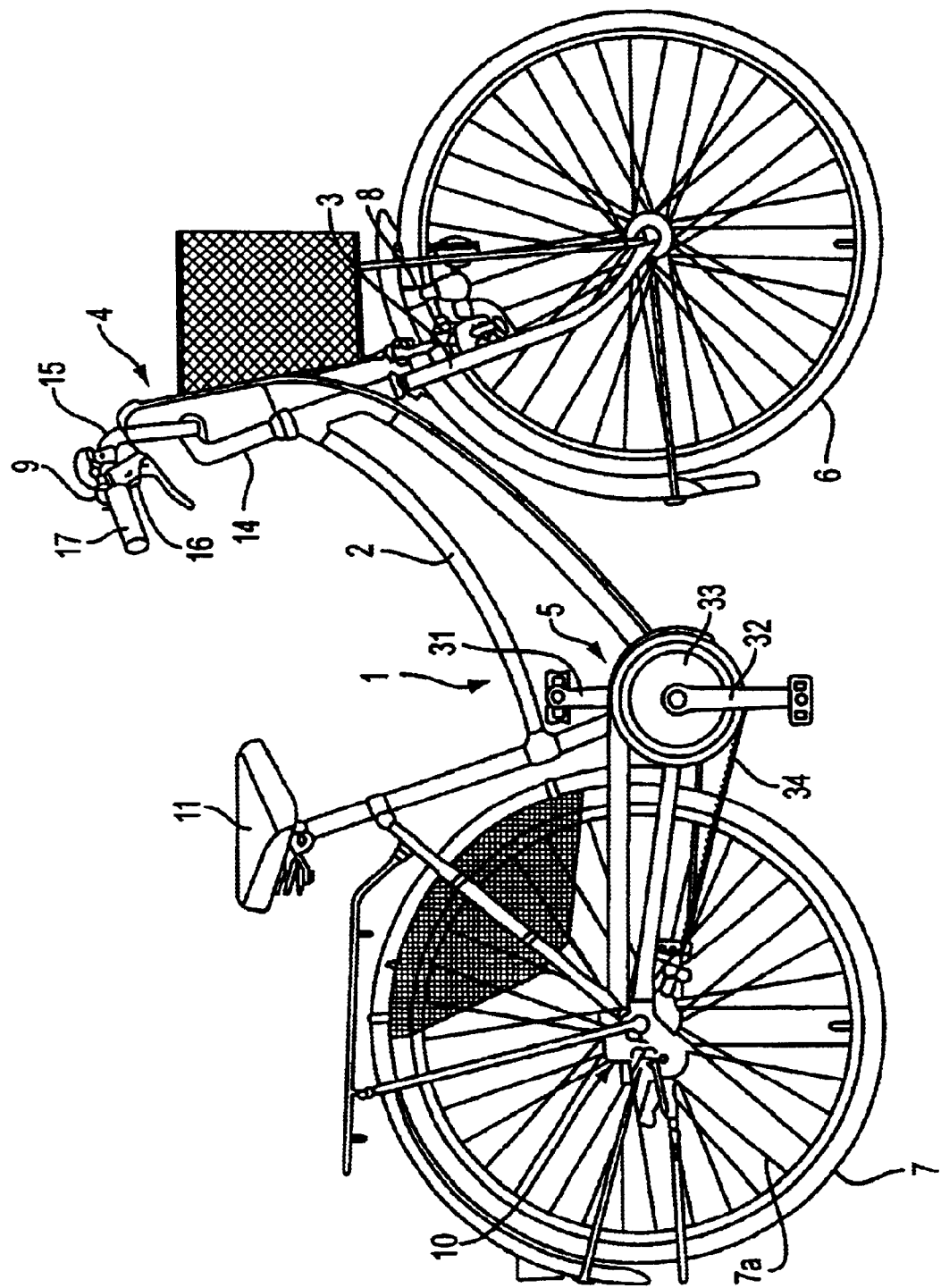
FIG. 1 is a side view of a bicycle that incorporates a particular embodiment of a torque sensor for a bottom bracket assembly according to the present invention.
Figure 2:
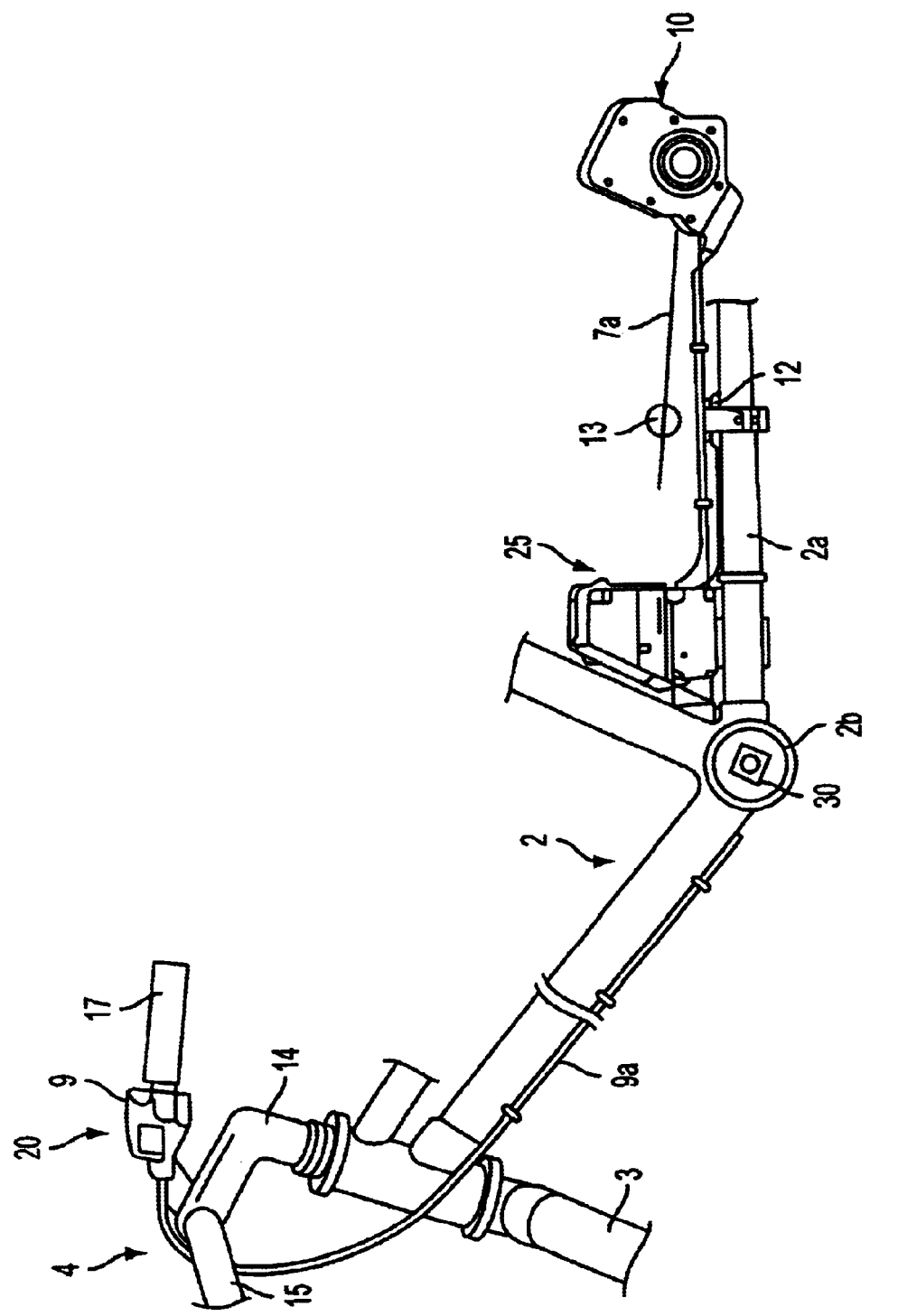
FIG. 2 is a more detailed view of a portion of the bicycle frame shown in FIG. 1.

In FIG. 1, the bicycle in which an embodiment of the present invention is used is a recreational bicycle comprising a frame 1 with a double loop type of frame unit 2 and a front fork 3; a handlebar assembly 4; a saddle 11, a drive component 5; a front wheel 6; a rear wheel 7 in which a four-speed internal electrical shifter hub 10 is mounted; front and rear brake devices 8 (only front one shown in figure); and a shift control element 9 for conveniently operating the internal electrical shifter hub 10. As is also shown in FIG. 2, a bicycle speed sensor 12 is provided to a chain stay 2a of the frame unit 2. This bicycle speed sensor 12 outputs a bicycle speed signal by detecting a magnet 13 mounted on a spoke 7a of the rear wheel 7.

The handlebar assembly 4 has a handle stem 14 that is fixed to the upper portion of the front fork 3 and a handlebar 15 that is fixed to the handle stem 14. Brake levers 16 and grips 17, which constitute part of the brake devices 8, are mounted at either end of the handlebar 15. The control panel 20 of the shift control element 9 is formed integrally with the right-side brake lever 16. The shift control element 9 is connected to a shift control component 25 through a control cable 9a. The shift control component 25 is mounted on the base of the chain stay 2a.

The drive component 5 comprises a bottom bracket axle assembly 30 mounted on the bottom bracket 2b of the frame unit 2; left- and right-side cranks 31 and 32 nonrotatably mounted on either end of the bottom bracket axle assembly 30; a chainwheel 33 that integrally rotates with the right-side crank 32; and a chain 34 wrapped around the chainwheel 33 for driving an internal shifter hub 10.

As shown in FIGS. 3–6, the bottom bracket axle assembly 30 comprises left- and right-side cylindrical members 40 and 41 mounted in an inner peripheral section on the mounting side of the left- and right-side cranks 31 and 32 of the bottom bracket 2b, an axle supporting member in the form of a cylindrical bearing housing 42 whose two ends are supported by these cylindrical members 40 and 41, a hollow bottom bracket axle 43 rotatably supported by the bearing housing 42, a pair of left- and right-side rolling element groups 44a and 44b disposed between the bottom bracket axle 43 and the bearing housing 42, and four pressure sensors 45a–45d mounted between the bearing housing 42 and the left- and right-side cylindrical members 40 and 41.

A left-side male threaded portion 40a in threaded engagement with the left-side female threaded portion 2c formed on the inner peripheral surface at the left end of the bottom bracket 2b is formed on the outer peripheral surface at the left end (FIG. 3) of the left-side cylindrical member 40. The size of the left-side male threaded portion 40a may, for example, be "BC 1.37 peak 24" (as defined in JIS D 9401 for bicycles) to allow mounting in the bottom bracket of a common bicycle. Splines 40b for securing a screw-in tool are formed in the inner peripheral section at the left end of the left-side cylindrical member 40. In addition, a contact portion 40c that is narrower than other portions is formed on the inner peripheral surface, and the left end of the bearing housing 42 rests against the inner end face of the contact portion 40c. The left-side cylindrical member 40 is locked, positioned in the direction of rotation, and fixed in the bottom bracket 2b by a locknut 50. Grooves 50a for securing a screw-in tool are formed in outer peripheral surface of the locknut 50 at regular intervals in the circumferential direction.

The right-side cylindrical member 41 is a flanged cylindrical member having a flange 41a. The outer peripheral surface at the right end thereof is provided with a right-side male threaded portion 41b in threaded engagement with the right-side female threaded portion 2d formed on the inner peripheral surface at the right end of the bottom bracket 2b. The size of the right-side male threaded portion 41b may, for example, be "BC 1.37 peak 24 left" (as defined in JIS D 9401 for bicycles) for a threaded portion having the opposite direction from the direction of the left-side male threaded portion 40a to allow mounting in the bottom bracket of a common bicycle. Grooves 41c for securing a screw-in tool are formed in the inner peripheral surface of the flange 41a. In addition, a contact portion 41d that is narrower than other portions is formed on the inner peripheral surface, and knurled radial positioning grooves 41e (FIG. 6) for positioning components in the direction of rotation relative to the bearing housing 42 are formed on the end face inside the contact portion 41d. The right end of the bearing housing 42 is pressed against the positioning grooves 41e.

The bearing housing 42 is disposed around the inside of the two cylindrical members 40 and 41, and the two ends thereof rest against the two cylindrical members 40 and 41. The end face on the right side of the bearing housing 42 (FIG. 3) is provided with knurled positioning grooves (not shown) in engagement with the positioning grooves 41e. The outer peripheral surface of the bearing housing 42 is provided with four substantially rectangular sensor-mounting depressions 46a–46d. The sensor-mounting depressions 46a–46d are designed for mounting pressure sensors 45a–45d between the bearing housing 42 and the respective left- and right-side cylindrical members 40 and 41.

The sensor-mounting depression 46a is mounted in a first position on the outer peripheral surface on the mounting side of the right-side crank 32, and the sensor-mounting depression 46b is mounted in a second position opposite the first position in relation to the central position C of the bottom bracket axle 43 in the axial direction. The first and second positions are positions substantially on the outer peripheral side that correspond to the mounting positions of the rolling element groups 44b and 44a. The sensor-mounting depression 46c is formed in a third position which faces the first position in the radial direction, and the sensor-mounting depression 46d is formed in a fourth position which faces the second position in the radial direction. As a result, the pressure sensor 45a and the pressure sensor 45d are positioned at a distance from each other in the axial direction, as are the pressure sensor 45c and the pressure sensor 45b.

The area between the mounting depressions in the bearing housing 42 is made narrower than other portions, and a groove 47 for accommodating wires is formed over some of the area. Annular race surfaces 42a and 42b are formed at a distance from each other in the axial direction on the inner peripheral surface of the bearing housing 42. The race surfaces 42a and 42b are formed at positions symmetrical about the central position C of the bottom bracket axle 43.

A connecting link 51 is interposed between the outer peripheral surface of the bearing housing 42 and the inner peripheral surface of the left-side cylindrical member 40. The connecting link 51 is a spring member obtained by bending a wire into an annular shape and designed to link the bearing housing 42 and the left-side cylindrical member 40 in a rotatably and axially immovable fashion.

The bottom bracket axle 43 is rotatably supported in the bottom bracket 2b by means of the bearing housing 42. Serrations 43a and 43b for nonrotatably linking the left- and right-side cranks 31 and 32 are formed at both ends of the bottom bracket axle 43. In addition, annular race surfaces 43c and 43d are formed on the outer peripheral surface of the bottom bracket axle 43 at positions facing the race surfaces 42a and 42b. A plurality of steel balls 44c and 44d constituting the rolling element groups 44a and 44b are disposed at regular intervals in the circumferential direction between the race surfaces 42a and 42b and the race surfaces 43c and 43d in contact with these surfaces. The plurality of steel balls 44c and 44d disposed at regular intervals are held by retainers 44e and 44f. The steel balls 44c and 44d are press-fitted between the two in a manner similar to that adopted for regular ball bearings.

Seal members 60a and 60b are placed on the outside of the rolling element groups 44a and 44b.

Figure 4:
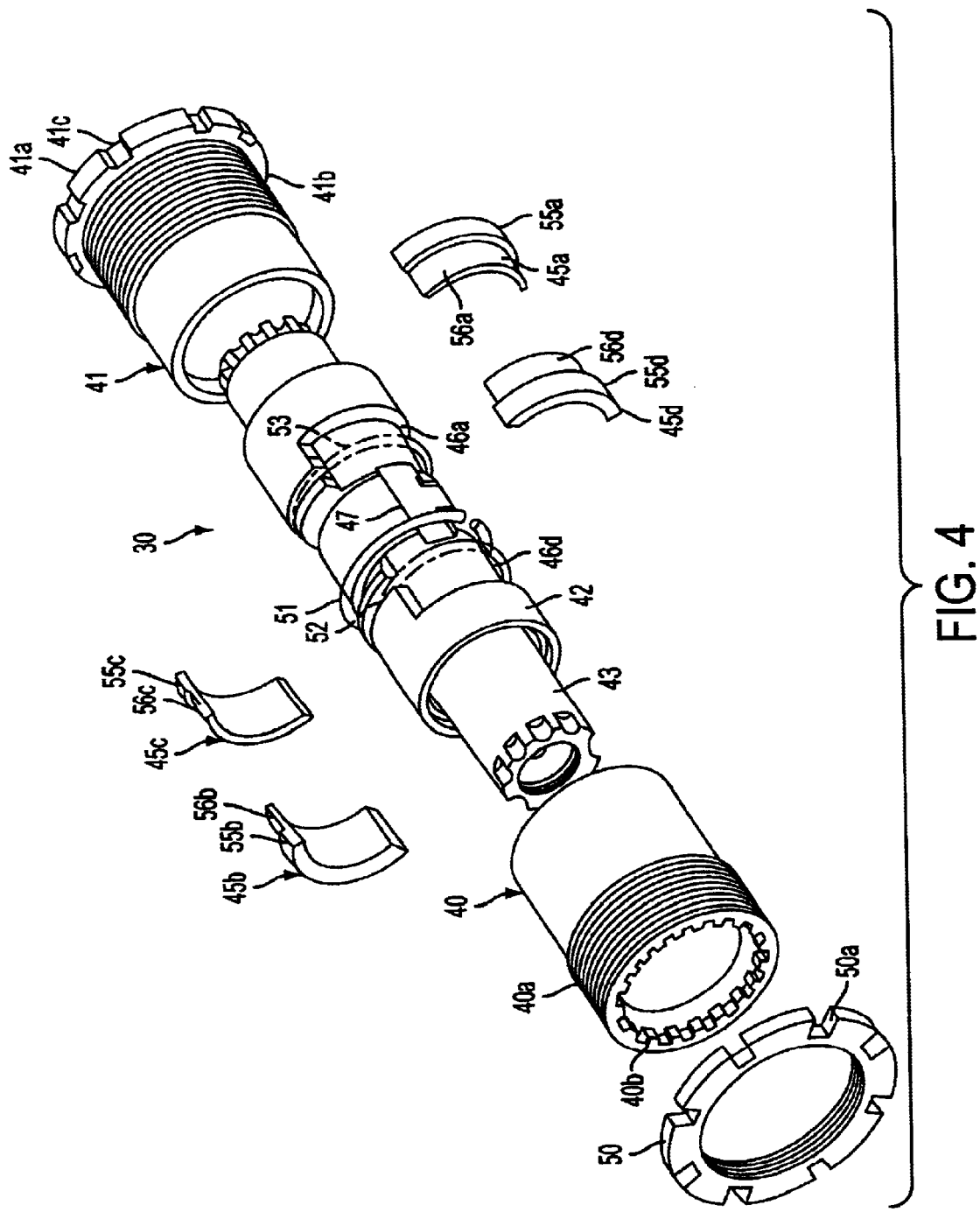
FIG. 4 is an exploded view of the bottom bracket axle assembly shown in FIG. 3.
Figure 5:
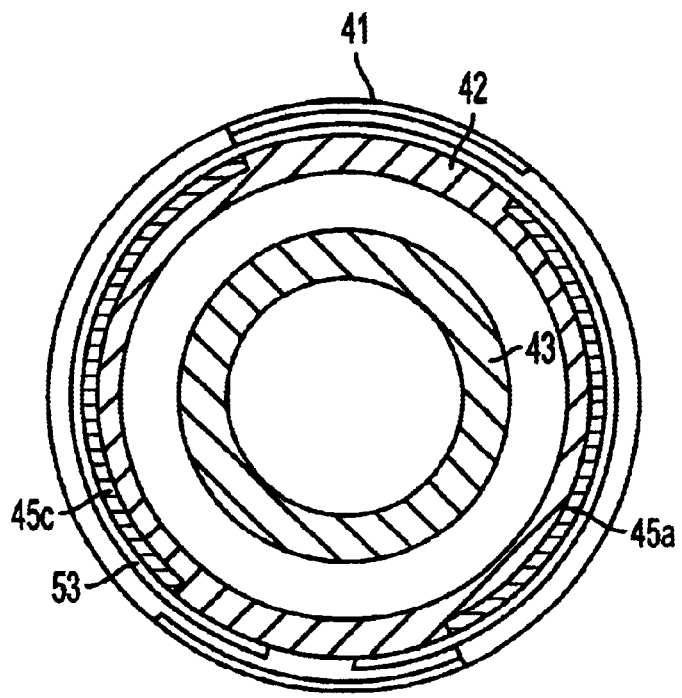
FIG. 5 is a view taken along line V—V in FIG. 3.
Figure 6:
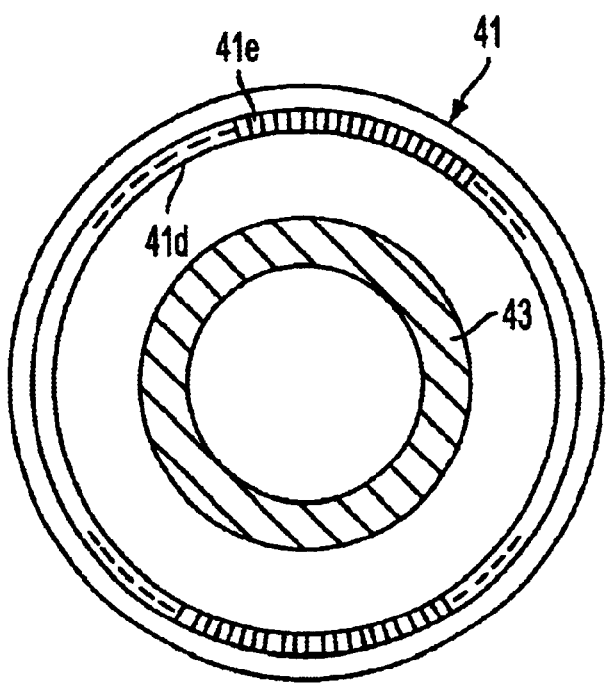
FIG. 6 is a view taken along line VI—VI in FIG. 3.

As shown in FIG. 4, the pressure sensors 45a–45d are plate-shaped members comprising wide portions 55a–55d and narrow portions 56a–56d and having fan-shaped cross sections configured such that they constitute part of a cylinder. The pressure sensors 45a–45d are ceramic elements that change their resistance depending on the pressure, and they are press-fitted between the bearing housing 42 and the cylindrical members 40 and 41. As shown in FIG. 5, the pressure sensor 45a is disposed on the opposite side from the direction of advance of the bicycle, that is, in the rear section of the bearing housing 42, and the pressure sensor 45c is disposed in the front section of the bearing housing 42. Similarly the pressure sensor 45b is disposed in the front section of the bearing housing 42.

Arranging the pressure sensors 45a and 45b at such positions causes the pressure applied to the pressure sensors 45a and 45b to vary markedly with torque and allows the torque acting on the bottom bracket axle 43 to be sensed with high accuracy when the chainwheel 33 is rotated by the cranks 31 and 32 and tension is created in the chain 34. That is because the tension in the chain tends to urge the bottom bracket axle 43 backward. In addition, providing the two sensors 45c and 45d in the respective positions facing the two pressure sensors 45a and 45b in the radial direction allows output from the pressure sensors 45a and 45b to be corrected, and the torque acting on the bottom bracket axle 43 to be sensed with higher accuracy.

Attachment rings 53 and 52 are mounted on the narrow portions 56a and 56c and the narrow portions 56b and 56d of the pressure sensors 45a and 45c and the pressure sensors 45b and 45d, respectively. The attachment rings 53 and 52, which are spring members consisting of wires bent into ring shapes, are designed to prevent the pressure sensors 45a–45d from moving or falling off during mounting.

Following is a description of a procedure in which the bottom bracket axle assembly 30 thus configured is mounted on a bottom bracket 2b. The bottom bracket axle 43 is incorporated in advance into the bearing housing 42 with the rolling element groups 44a and 44b. In addition, the bearing housing 42 is incorporated into the left-side cylindrical member 40, and the two components are linked in advance by a connecting link 51.

The right-side cylindrical member 41 is first screwed into the right-side female threaded portion 2d of the bottom bracket 2b with the aid of a screw-in tool. In the process, the right-side cylindrical member 41 is rotated counterclockwise because the right-side female threaded portion 2d is a left-handed thread. The left-side cylindrical member 40 is then screwed with the aid of a screw-in tool into the left-side female threaded portion 2c of the bottom bracket 2b. The left-side cylindrical member 40 is rotated clockwise because the left-side female threaded portion 2c is a right-handed thread. The moment the tip of the bearing housing 42 comes into contact with the positioning grooves 41e of the contact portion 41d of the right-side cylindrical member 41, the rotational position of the bearing housing 42 is adjusted such that the pressure sensors 45a–45d are aligned in a prescribed direction, and the left-side cylindrical member 40 is locked in the adjusted position by a locknut 50 following adjustment. At this time, the positioning grooves of the bearing housing 42 and the positioning grooves 41e of the right-side cylindrical member 41 mesh with each other, thus making it difficult for the pressure sensors 45a–45d to change their rotational positions once they are adjusted. Finally, mounting the left- and right-side cranks 31 and 32 on the two ends of the bottom bracket axle 43 and extending a chain 34 between the chainwheel 33 and the internal shifter hub 10 allow the rotation of the cranks 31 and 32 to be transmitted to the rear wheel 7 through the agency of the internal shifter hub 10.

When the cranks 31 and 32 are turned, the resulting rotation is transmitted to the internal shifter hub 10 through the chainwheel 33 and the chain 34, and the rear wheel 7 is rotated. In the process, a torque acts on the bottom bracket axle 43 due to the generation of tension in the chain. The torque acting on the bottom bracket axle 43 creates a force that tends to urge the bottom bracket axle 43 backward. The resulting force is transmitted to the bearing housing 42 through the rolling element groups 44a and 44b, and a pressure that is proportional to the torque is generated in the pressure sensors 45a and 45b disposed between the bearing housing 42 and the two cylindrical members 40 and 41. The pressure thus generated is converted to torque by the shift control component 25, and the shift timing is controlled in accordance with the torque and bicycle speed.

In this embodiment, the torque sensor can be made smaller because a pressure-based torque is sensed, and the pressure sensors 45a–45d can be disposed between the bearing housing 42 and the two cylindrical members 40 and 41. In addition, pressure can be sensed with high efficiency because the pressure sensors are disposed near the position of maximum applied force. This position does not require high accuracy, thus making the components easier to install.

Figure 7:
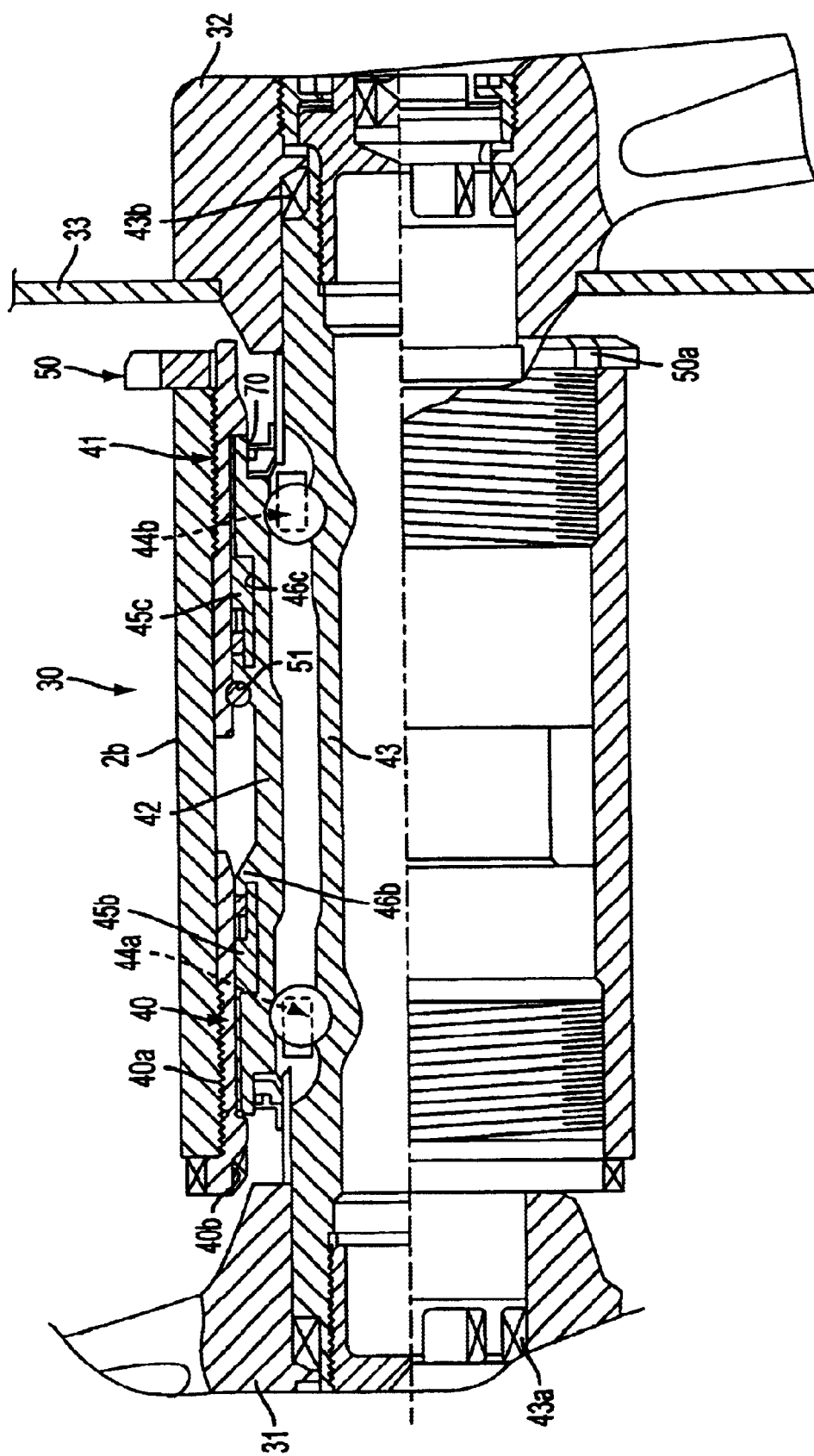
FIG. 7 is a partial cross sectional view of a particular embodiment of a bottom bracket assembly that incorporates another embodiment of a torque sensor according to the present invention.
Figure 8:
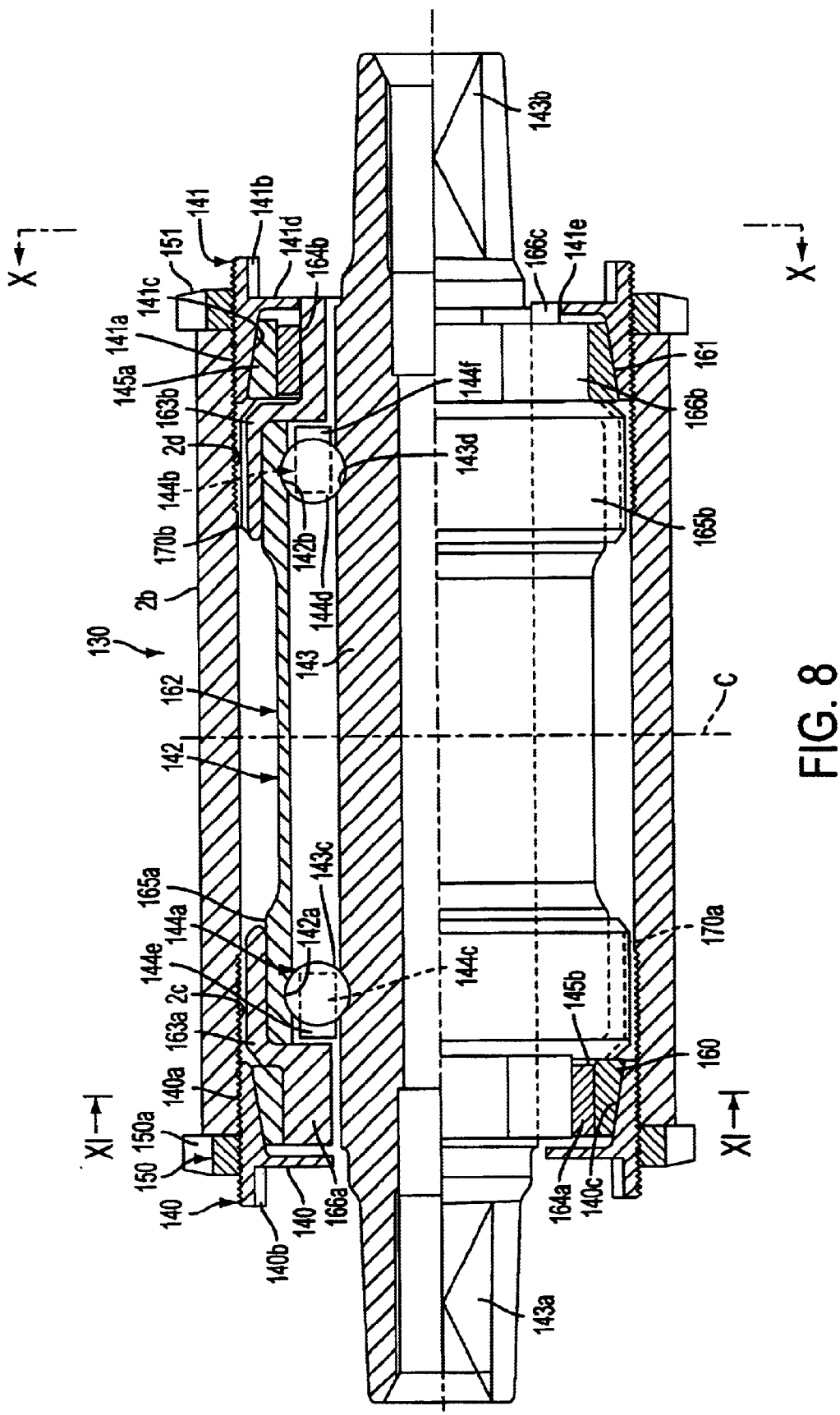
FIG. 8 is a partial cross sectional view of a particular embodiment of a bottom bracket assembly that incorporates another embodiment of a torque sensor according to the present invention.

FIG. 7 is a partial cross sectional view of a particular embodiment of a bottom bracket assembly that incorporates another embodiment of a torque sensor according to the present invention. As shown in FIG. 7, it is possible to use a left-side cylindrical member 40 in the form of a flanged cylindrical member and to position the right-side cylindrical member 41 with the aid of a locknut 50. In this case, the bearing housing 42 is linked to the right-side cylindrical member 41 via a connecting link 51. In addition, the right-side cylindrical member 41 and the bearing housing 42 are positioned in the direction of rotation with the aid of serrations 70. Furthermore, the bearing housing 42 is merely supported without coming into contact with the left-side cylindrical member 40. Other elements of the structure are the same as in the above-described embodiment, and their description will therefore be omitted.

To assemble this bottom bracket axle assembly 30a, the left-side cylindrical member 40 is first screwed into the bottom bracket 2b. The right-side cylindrical member 41 linked to the bearing housing 42, which is positioned in the direction of rotation, is then screwed into the bottom bracket 2b. The rotational position of the right-side cylindrical member 41 is adjusted such that the pressure sensors 45a–45d occupy the desired rotational positions, and the right-side cylindrical member 41 is locked and fixed in the bottom bracket 2b with the aid of the locknut 50. The bottom bracket axle assembly 30a thus configured has the same effects as the above-described embodiment.

Although the above embodiments involved an arrangement in which pressure sensors 45a and 45b were placed around the outside of the rolling element groups 44a and 44b of the bearing housing 42, it is also possible to place pressure sensors 145a and 145b on the outside of rolling element groups 144a and 144b, as shown in FIGS. 8–11. As shown in those Figures, a bottom bracket axle assembly 130 comprises left- and right-side cylindrical members 140 and 141 mounted in an inner peripheral section on the mounting side of the left- and right-side cranks of the bottom bracket 2b, a cylindrical bearing housing 142 whose two ends are supported by these cylindrical members 140 and 141, a hollow bottom bracket axle 143 rotatably supported by the bearing housing 142, a pair of left- and right-side rolling element groups 144a and 144b disposed between the bottom bracket axle 143 and the bearing housing 142, and two pressure sensors 145a and 145b mounted between the bearing housing 142 and the left- and right-side cylindrical members 140 and 141.

A left-side male threaded portion 140a in threaded engagement with the left-side female threaded portion 2c formed on the inner peripheral surface at the left end of the bottom bracket 2b is formed on the outer peripheral surface at the left end (FIG. 8) of the left-side cylindrical member 140. The size of the left-side male threaded portion 140a may, for example, be "BC 1.37 peak 24" (as defined in JIS D 9401 for bicycles) to allow mounting in the bottom bracket of a common bicycle. Splines 140b for securing a screw-in tool are formed on the inner peripheral surface at the left end of the left-side cylindrical member 140. In addition, a tapered surface 140c that has a progressively smaller diameter toward the outside in the axial direction is formed on the inner peripheral surface of the inner portion, and a sensor-pressing member 160 (described below) is pushed against this tapered surface 140c. A discoid left-side wall 140d is formed between the tapered surface 140c and the splines 140b of the left-side cylindrical member 140. The bottom bracket axle 143 passes through the center of the left-side wall 140d. The left-side cylindrical member 140 is locked, positioned in the direction of rotation, and fixed in the bottom bracket 2b by a locknut 150. Grooves 150a for securing a screw-in tool are formed in outer peripheral surface of the locknut 150 at regular intervals in the circumferential direction.

The right-side cylindrical member 141 is a cylindrical member having substantially the same shape as the left-side cylindrical member 140. The outer peripheral surface at the right end thereof is provided with a right-side male threaded portion 141a in threaded engagement with the right-side female threaded portion 2d formed on the inner peripheral surface at the right end of the bottom bracket 2b. The size of the right-side male threaded portion 141a may, for example, be "BC 1.37 peak 24 left" (as defined in JIS D 9401 for bicycles) for a threaded portion having the opposite direction from the direction of the left-side male threaded portion 140a to allow mounting in the bottom bracket of a common bicycle. Splines 141b for securing a screw-in tool are formed in the inner peripheral surface of outer portion. In addition, a tapered surface 141c that has a progressively smaller diameter toward the outside in the axial direction is formed on the inner peripheral surface of the inner portion, and a sensor-pressing member 161 (described below) is pushed against this tapered surface 141c. A discoid right-side wall 141d is formed between the tapered surface 141c and the splines 141b of the right-side cylindrical member 141. Four rectangular notches 141e (FIGS. 9 and 10) for nonrotatably stopping the bearing housing 142 are formed in the center of the right-side wall 141d. The right-side cylindrical member 141 is locked, positioned in the direction of rotation, and fixed in the bottom bracket 2b by a locknut 151. Grooves 151a for securing a screw-in tool are formed in outer peripheral surface of the locknut 151 at regular intervals in the circumferential direction.

The bearing housing 142 is disposed around the inside of the two cylindrical members 140 and 141, and the two ends thereof are brought into contact with the two cylindrical members 140 and 141 through the sensor-pressing members 160 and 161. The bearing housing 142 comprises a cylindrical housing body 162 in which two rolling element groups 144a and 144b are disposed around the inside at a distance from each other in the axial direction. A pair of sensor-mounting members 163a and 163b are mounted on the two ends of the housing body 162. Annular race surfaces 142a and 142b are formed at a distance from each other in the axial direction on the inner peripheral surface of the housing body 162. The race surfaces 142a and 142b are formed at positions that are symmetrical about the central position C of the bottom bracket axle 43. The sensor-pressing members 160 and 161 are disposed between the sensor-mounting members 163a and 163b and the tapered surfaces 140c and 141c of the left- and right-side cylindrical members 140 and 141 while allowed to come into close contact with the pressure sensors 145b and 145a.

The sensor-pressing members 160 and 161 are designed to bring the pressure sensors 145b and 145a into close contact with the first and second sensor mounting members 163a and 163b and to firmly secure the pressure sensors 145a and 145b against first and second sensor mounting members 163a and 163b without creating any chatter. The sensor-pressing members 160 and 161 are elastic metal members that have a substantially cylindrical shape and that are provided along the outer peripheral surfaces thereof with tapered surfaces 160a and 161a. The tapered surfaces have a progressively smaller diameter toward the outside in the axial direction. The cross sections of the inner peripheral surfaces of the sensor-pressing members 160 and 161 are substantially perfect octagons, and the pressure sensors 145a and 145b and the sensor-mounting members 163a and 163b are pressed against the inner peripheral surfaces of these perfect octagons. The sensor-pressing members 160 and 161 are provided with a plurality of slits 160b and 161b that are cut such that they pass through the inner and outer peripheries in the axial direction. The slits 160b and 161b are formed in the sensor-mounting sections. The slits 160b and 161b form a structure in which grooves extending from either end of the sensor-pressing members 160 and 161 toward the end portion on the other side are arranged in four groups at regular intervals in the radial direction. Providing such slits makes it easier for the sensor-pressing members 160 and 161 to contact and expand in the radial direction, and they ensure that the pressure sensors 145b and 145a can be brought into close contact.

The sensor-mounting members 163a and 163b comprise wide cylindrical components 165a and 165b tightly fitted over the outer peripheral surfaces at the two ends of the housing body 162, and mounting components 166a and 166b that are integrally formed on the two ends of the cylindrical components 165a and 165b and that have outer peripheral surfaces in the form of irregular octagons. Grooved sections 170a and 170b for wires are formed adjacent to the mounting sections of the pressure sensors 145b and 145a of the cylindrical components 165a and 165b.

Figure 10:
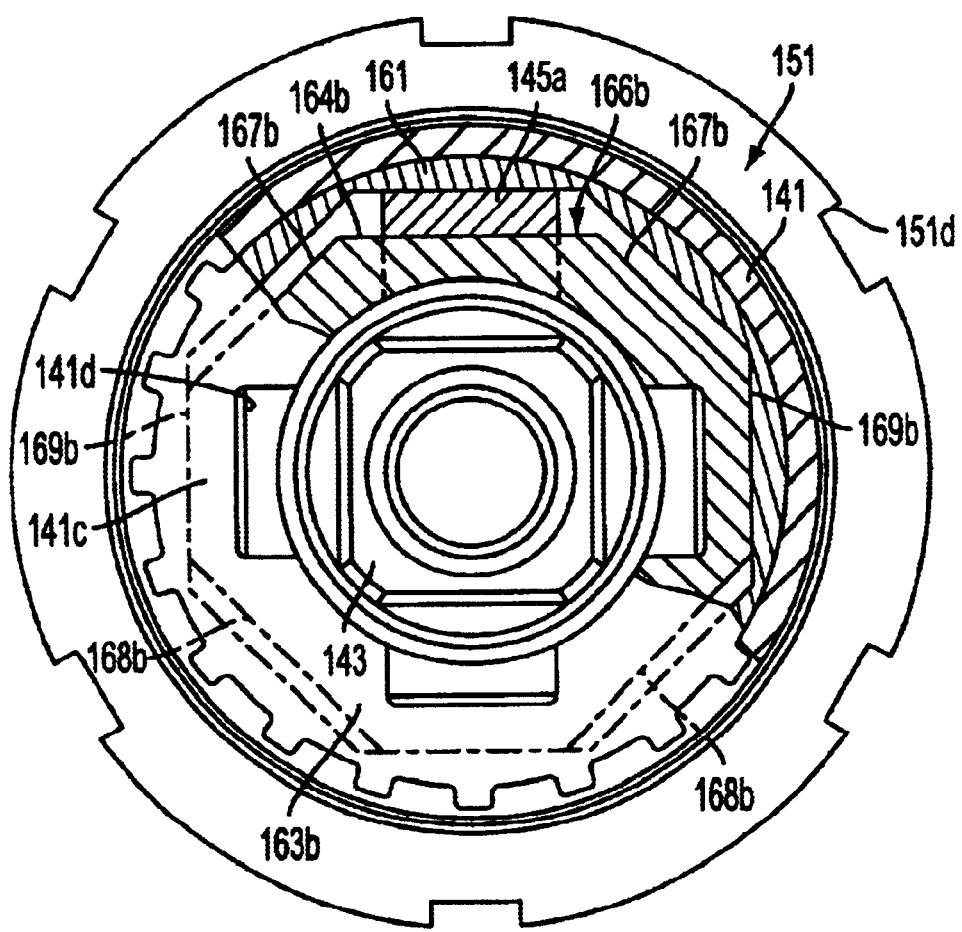
FIG. 10 is a view taken along line X—X in FIG. 8 with the upper portion partially cut away to show the pressure sensor.
Figure 11:
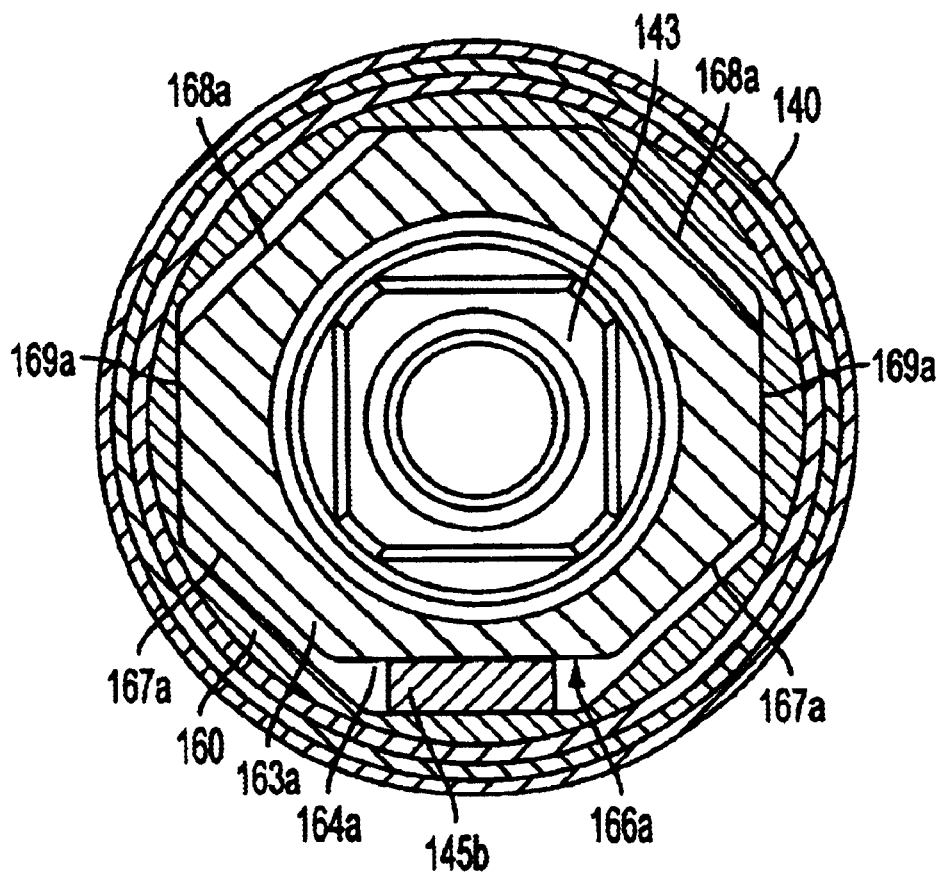
FIG. 11 is a view taken along line XI—XI in FIG. 8.

The mounting components 166a and 166b, which are disposed facing the inner peripheral sides of the sensor-pressing members 160 and 161, have mounting surfaces 164a and 164b on their respective outer peripheral surfaces. The pressure sensor 145b and pressure sensor 145a can be mounted on these mounting surfaces. As shown in FIGS. 10 and 11, the mounting components 166a and 166b, in which the outer peripheral surfaces facing the sensor-pressing members 160 and 161 have irregular octagonal shapes in cross section, are spaced apart from the inner peripheral surfaces of the sensor-pressing members 160 and 161 along the mounting surfaces 164a and 164b, along the two surfaces 167a and 167b adjacent to the mounting surfaces 164a and 164b, and along the two facing surfaces 168a and 168b located opposite the two surfaces 167a and 167b, and are brought into contact with the inner peripheral surfaces of the sensor-pressing members 160 and 161 along a pair of contact surfaces 169a and 169b facing each other between the two surfaces 167a and 167b and the facing surfaces 168a and 168b.

The tip of the right-side mounting component 166b is provided with four engagement protrusions 166c for engaging the four rectangular notches 141e formed in the center of the right-side wall 141d of the right-side cylindrical member 141, with the protrusions extending in the axial direction. The pressure sensor 145a can be positioned in the rear section of the bearing housing 142 by causing the engagement protrusions 166c to engage the notches 141e, as described below.

The bottom bracket axle 143 is rotatably supported in the bottom bracket 2b by means of the bearing housing 142. Chamfered portions 143a and 143b for the nonrotatable linkage of right and left cranks are formed at the two ends of the bottom bracket axle 143. In addition, annular race surfaces 143c and 143d are formed on the outer peripheral surface of the bottom bracket axle 143 at positions facing the race surfaces 142a and 142b. A plurality of steel balls 144c and 144d constituting the rolling element groups 144a and 144b are disposed at regular intervals in the circumferential direction between the race surfaces 142a and 142b and the race surfaces 143c and 143d in contact with these surfaces. The plurality of steel balls 144c and 144d disposed at regular intervals are held by retainers 144e and 144f.

The steel balls 144c and 144d are press-fitted between the two component in a manner similar to that adopted for regular ball bearings. The sensor-mounting members 163a and 163b are mounted in combination with seal members outside the rolling element groups 144a and 144b.

Figure 9:
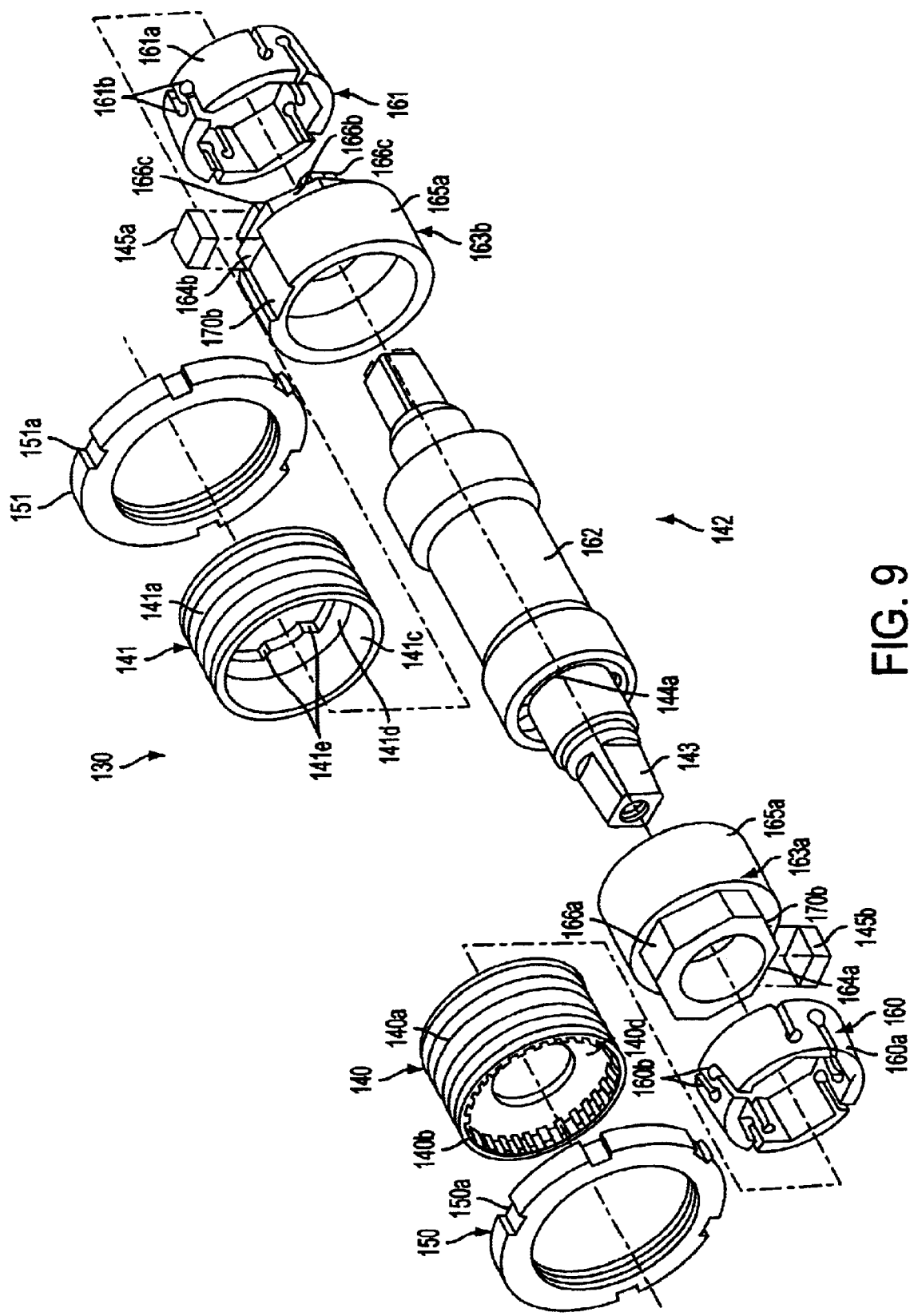
FIG. 9 is an exploded view of the bottom bracket axle assembly shown in FIG. 8.

The pressure sensors 145a and 145b, which are members shaped as rectangular plates in the manner shown in FIG. 9, are ceramic elements whose resistance varies with pressure. The pressure sensors 145b and 145a are press-fitted between the left- and right-side cylindrical members 140 and 141 and the left- and right-side sensor-mounting members 163a and 163b of the bearing housing 142. In this case, the pressure sensor 145a is disposed on the side opposite the direction of travel of the bicycle, that is, in the rear section of the bearing housing 142 (as shown in FIG. 10), and the pressure sensor 145b is disposed in the front section of the bearing housing 142, as shown in FIG. 11. Arranging the pressure sensors 145a and 145b at such positions causes the pressure applied to the pressure sensors 145a and 145b to vary markedly with torque and allows the torque acting on the bottom bracket axle 143 to be sensed with high accuracy when the chainwheel 33 is rotated by the cranks 31 and 32 and tension is created in the chain 34. The tension in chain 34 tends to urge the bottom bracket axle 143 backward.

Following is a description of a procedure in which the bottom bracket axle assembly 130 thus configured is mounted on a bottom bracket 2b. The bottom bracket axle 143 is incorporated in advance into the bearing housing 142 with the rolling element groups 144a and 144b. In addition, the sensor-pressing members 160 and 161 and the pressure sensors 145b and 145a are mounted on both ends of the bearing housing 142. In the process, the left- and right-side pressure sensors 145b and 145a are disposed diagonally opposite to each other.

Initially, the right-side cylindrical member 141 is screwed with the aid of a screw-in tool into the right-side female threaded portion 2d of the bottom bracket 2b until one of the notches 141e of the right-side cylindrical member 141 reaches an appropriate position that faces the forward section. In the process, the right-side cylindrical member 141 is rotated counterclockwise because the right-side female threaded portion 2d is a left-handed thread. The bearing housing 142, which is provided with the sensor-pressing members 160 and 161 mounted on the two ends thereof, is subsequently inserted into the bottom bracket 2b until a position is reached in which the engagement protrusions 166c engage the notches 141e such that the pressure sensor 145a is disposed in the rear section. The left-side cylindrical member 140 is then screwed with the aid of a screw-in tool into the left-side female threaded portion 2c of the bottom bracket 2b. The left-side cylindrical member 140 is rotated clockwise because the left-side female threaded portion 2c is a right-handed thread.

Fastening the left-side cylindrical member 140 with a prescribed torque allows the sensor-pressing members 160 and 161 to be compressed by the wedge action of the double-tapered surfaces 140c, 160a, 141c, and 161a, and firmly attaches the pressure sensors 145b and 145a to the mounting surfaces 164a and 164b. The chatter of the pressure sensors 145b and 145a can therefore be reduced, and the sensors can be securely fixed in the bearing housing 142. After the positions of the pressure sensors 145a and 145b in the circumferential direction have been adjusted, the left- and right-side cylindrical members 140 and 141 are locked in the adjusted positions with locknuts 150 and 151. Finally, mounting the left- and right-side cranks 31 and 32 on the two ends of the bottom bracket axle 143 and extending a chain 34 between the chainwheel 33 and the internal shifter hub 10 allow the rotation of the cranks 31 and 32 to be transmitted to the rear wheel 7 through the internal shifter hub 10.

In this arrangement, two pressure sensors 145b and 145a are mounted outside a housing body 162 provided with rolling element groups 144a and 144b, thus making it possible to place the two pressure sensors 145b and 145a close to the center in the radial direction. The two pressure sensors 145b and 145a can therefore be mounted without any reduction in the radial dimensions.

In addition, the pressure sensors 145b and 145a are attached to the mounting surfaces 164a and 164b by the sensor-pressing members 160 and 161, thus making it possible to fix the pressure sensors 145b and 145a securely and without any chatter. Force can therefore be transmitted to the pressure sensors 145b and 145a with high efficiency, and the sensitivity of the pressure sensors 145b and 145a can be improved.

Figure 3:
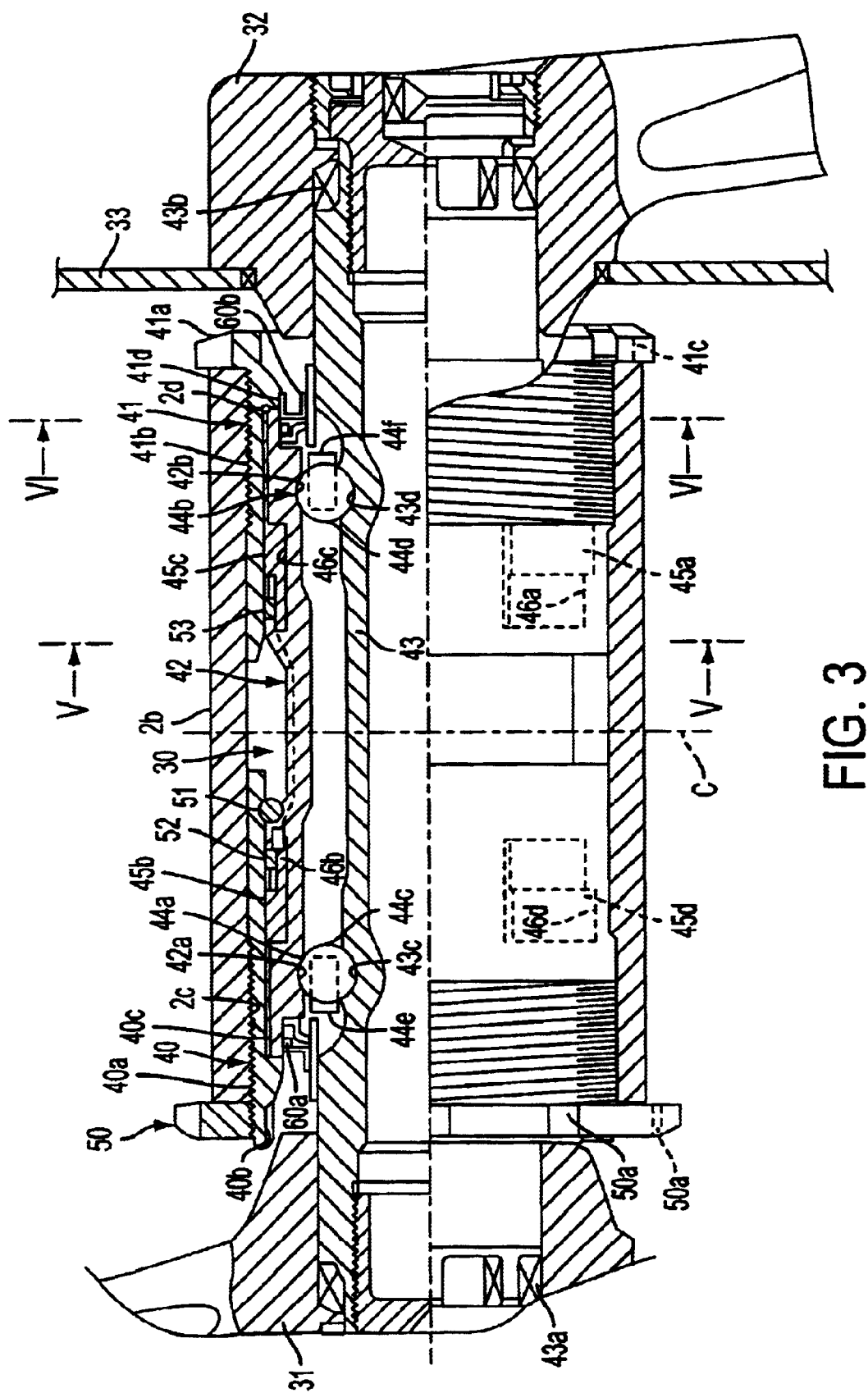
FIG. 3 is a partial cross sectional view of a particular embodiment of a bottom bracket assembly that incorporates a torque sensor according to the present invention.

The operation of this embodiment is substantially the same as that of the embodiment shown in FIG. 3, and thus will be omitted from the description. In this arrangement, no pressure sensor has been provided for correction purposes, but, in practice, torque can be sensed with high accuracy even without correcting the sensor output.

Figure 12:
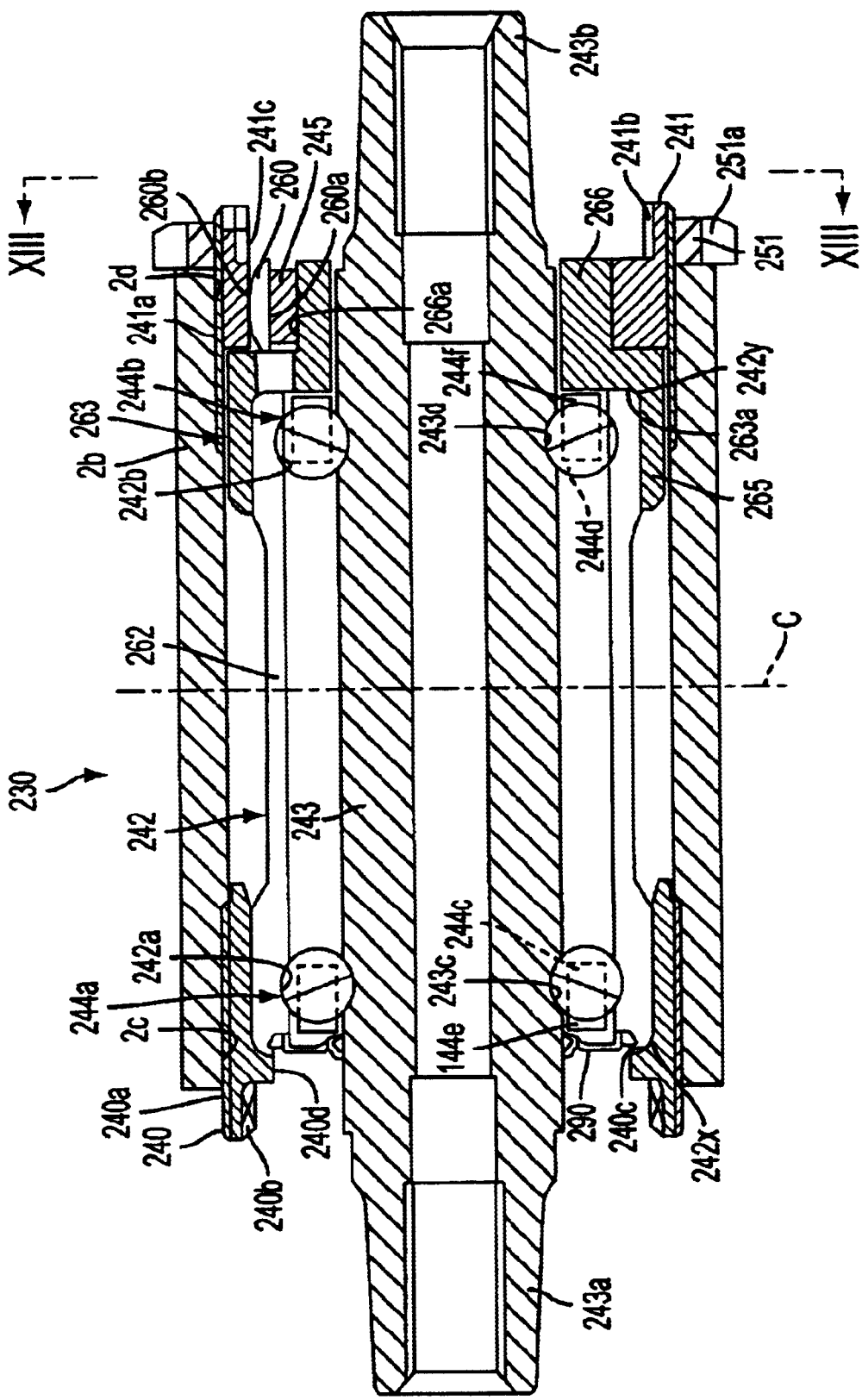
FIG. 12 is a cross sectional view of a particular embodiment of a bottom bracket assembly that incorporates another embodiment of a torque sensor according to the present invention.
Figure 13:
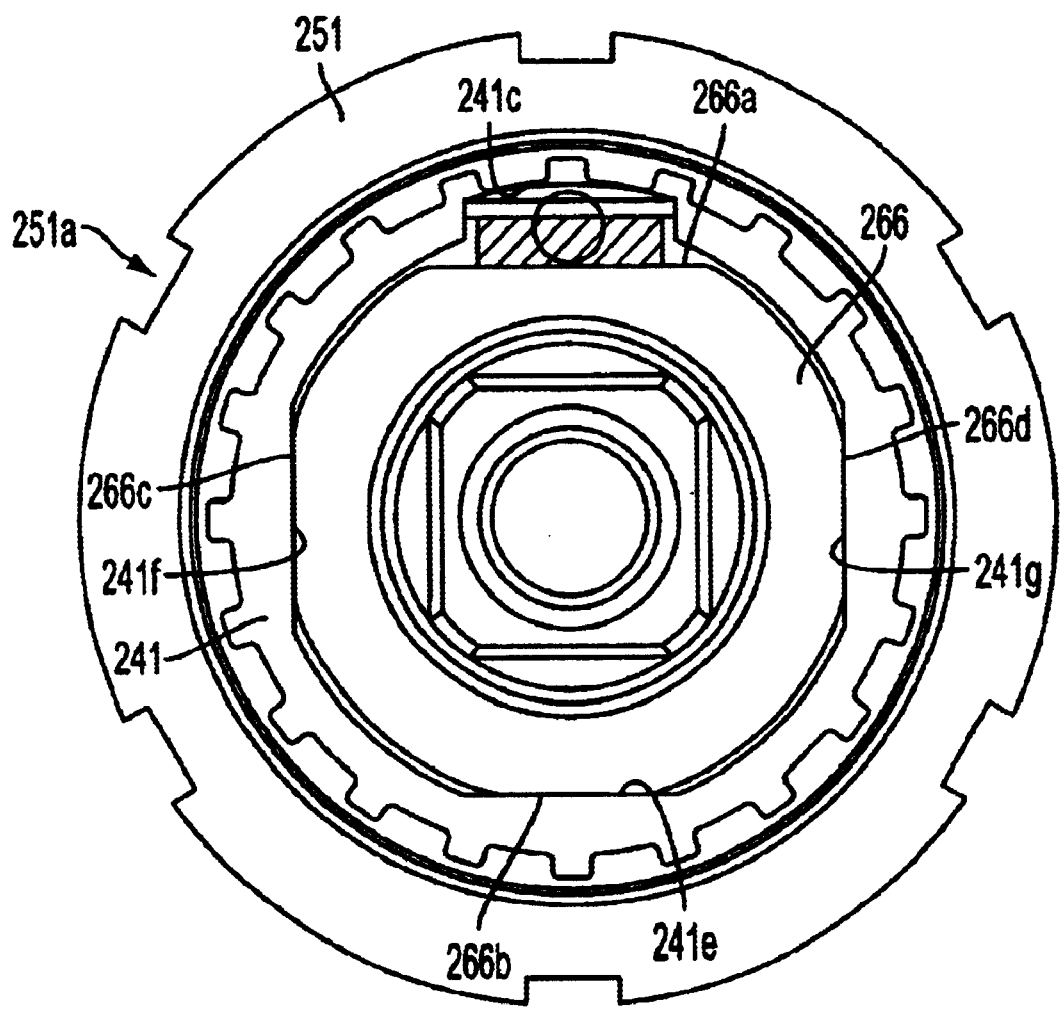
FIG. 13 is a view taken along line XIII—XIII in FIG. 12.

FIG. 12 is a cross sectional view of a particular embodiment of a bottom bracket assembly 230 that incorporates another embodiment of a torque sensor according to the present invention; and FIG. 13 is a view taken along line XIII-XIII in FIG. 12. As shown in those Figures, a bottom bracket axle assembly 230 comprises left- and right-side cylindrical members 240 and 241 mounted on the ends of the bottom bracket 2b, a cylindrical bearing housing 242, a hollow bottom bracket axle 243 rotatably supported by the bearing housing 242 through a pair of left- and right-side rolling element groups 244a and 244b, a sensor mounting member 263 mounted on the right side of bearing housing 242, a pressure sensor 245 mounted on an outer peripheral surface of sensor mounting member 263, and a sensor pressing member 260 disposed between pressure sensor 245 and right-side cylindrical member 241.

Bearing housing 242 comprises a cylindrical housing body 262. Annular race surfaces 242a and 242b are formed at a distance from each other in the axial direction on the inner peripheral surface of the housing body 262. The race surfaces 242a and 242b are formed at positions that are symmetrical about the central position C of the bottom bracket axle 243. Bottom bracket axle 243 is a generally hollow member having chamfered portions 243a and 243b at opposite ends thereof for the nonrotatable linkage of right and left cranks In addition, annular race surfaces 243c and 243d are formed on the outer peripheral surface of the bottom bracket axle 243 at positions facing the race surfaces 242a and 242b of bearing housing 242. A plurality of steel balls 244c and 244d constituting the rolling element groups 244a and 244b are disposed at regular intervals in the circumferential direction between the race surfaces 242a and 242b and the race surfaces 243c and 243d in contact with these surfaces. The plurality of steel balls 244c and 244d are held at these regular intervals by retainers 244e and 144f. The steel balls 244c and 244d are press-fitted between the two component in a manner similar to that adopted for regular ball bearings.

A threaded outer peripheral surface 240a of left-side cylindrical member 240 threadingly engages a threaded inner peripheral surface 2c at the left end of the bottom bracket 2b. The size of threaded outer peripheral surface 240a may, for example, be "BC 1.37 peak 24" (as defined in JIS D 9401 for bicycles) to allow mounting in the bottom bracket of a common bicycle. A concave inner peripheral surface 240c of left-side cylindrical member 240 abuts against a convex end 242x of bearing housing 242 to position bearing housing 242 in bottom bracket 2b. Splines 240b for engaging a screw-in tool are formed at the left-side inner peripheral surface of the left-side cylindrical member 240. A discoid left-side wall 240d is formed between the concave surface 240c and the splines 240b, and an annular seal member 290 is fitted between axle 243 and left-side wall 240d. Bottom bracket axle 243 passes through the center of the left-side wall 240d.

The right-side cylindrical member 241 is shaped somewhat differently from the left-side cylindrical member 240.

A threaded outer peripheral surface 241a of right-side cylindrical member 241 threadingly engages a threaded inner peripheral surface 2d at the right end of the bottom bracket 2b. The size of the threaded outer peripheral surface 241a may, for example, be "BC 1.37 peak 24 left" (as defined in JIS D 9401 for bicycles) which is threaded in the opposite direction from the threaded outer peripheral surface 240a of left-side cylindrical member 240 to allow mounting in the bottom bracket of a common bicycle. Splines 241b for engaging a screw-in tool are formed in the inner peripheral surface of cylindrical member 241.

A surface 241c that is flat in the axial and circumferential directions is formed on the inner peripheral surface of right-side cylindrical member 241, and sensor-pressing member 260 (described below) is pushed against this flat surface 241c. Three surfaces 241e, 241f and 241g (FIG. 13) that are flat in the axial and circumferential directions are formed on the inner peripheral surface of cylindrical member 241 for nonrotatably engaging a sensor mounting member 263 (described below), wherein surface 241e is located diametrically opposite surface 241c, surface 241f is diametrically opposite surface 241g, and surfaces 241f and 241g are orthogonal to surfaces 241c and 241e. The right-side cylindrical member 241 is locked, positioned in the direction of rotation, and fixed in the bottom bracket 2b by a locknut 251. Grooves 251a for engaging a screw-in tool are formed in the outer peripheral surface of the locknut 251 at regular intervals in the circumferential direction.

A sensor-mounting member 263 is mounted on the right side end of the housing body 262. Sensor-mounting member 263 comprises a larger diameter cylindrical component 265 tightly fitted over the outer peripheral surface of the housing body 262, and a smaller diameter sensor mounting component 266 that extends from the right side of larger diameter cylindrical component 265. A concave inner peripheral surface 263a of sensor mounting member 263 abuts against a convex end 242y of bearing housing 242 to position bearing housing 242 in bottom bracket 2b. A surface 266a that is flat in the axial and circumferential directions is formed on the outer peripheral surface of smaller diameter sensor mounting component 266, and pressure sensor 245 is pushed against this flat surface 266a. Three surfaces 266b, 266c and 266d (FIG. 13) that are flat in the axial and circumferential directions and which contact surfaces 241e, 241f and 241g, respectively, are formed on the outer peripheral surface of smaller diameter sensor mounting component 266 for nonrotatably engaging right-side cylindrical member 241. As shown in FIG. 13, surface 266b is located diametrically opposite surface 266a, surface 266c is diametrically opposite surface 266d, and surfaces 266a and 266b are orthogonal to surfaces 266c and 266d.

As with the above embodiments, pressure sensor 245 is shaped as a rectangular plate and is a ceramic element whose resistance varies with pressure. However, unlike the embodiment shown in FIG. 8, sensor pressing member 260 is a generally rectangular, square or round plate-shaped member having a flat bottom surface 260a contacting pressure sensor 245 and a curved, preferably rounded and preferably spherical upper surface 260b having a substantially constant radius of curvature contacting flat surface 241c of right-side cylindrical member 241. The flat bottom surface 260a helps ensure that the pressure applied between pressure sensor 245 and sensor pressing member 260 is evenly distributed along the upper surface of pressure sensor 245, thus avoiding localized points of high pressure against the generally fragile ceramic pressure sensor 245 and providing more accurate pressure measurements. The generally spherical upper surface 260b of sensor pressing member 260 contacts the flat surface 241c at a point, thus allowing the sensor pressing member 260 to spread out and distribute the contact force evenly along the flat bottom surface 260a, again preventing localized points of high pressure against the generally fragile ceramic pressure sensor 245 and providing more accurate pressure measurements.

As with the above embodiments, the pressure sensor 245 preferably is disposed on the side opposite the direction of travel of the bicycle, that is, in the rear section of the bearing housing 242. Although only one pressure sensor 245 is shown located on the right-side of bottom bracket axle assembly 230, a second pressure sensor and accompanying components similar to that shown for the right-side of bottom bracket assembly 230 may be provided on the left-side of bottom-bracket axle assembly 230 and mounted on the front side of bottom bracket axle assembly 230 similar to the above embodiments.

Figure 14:
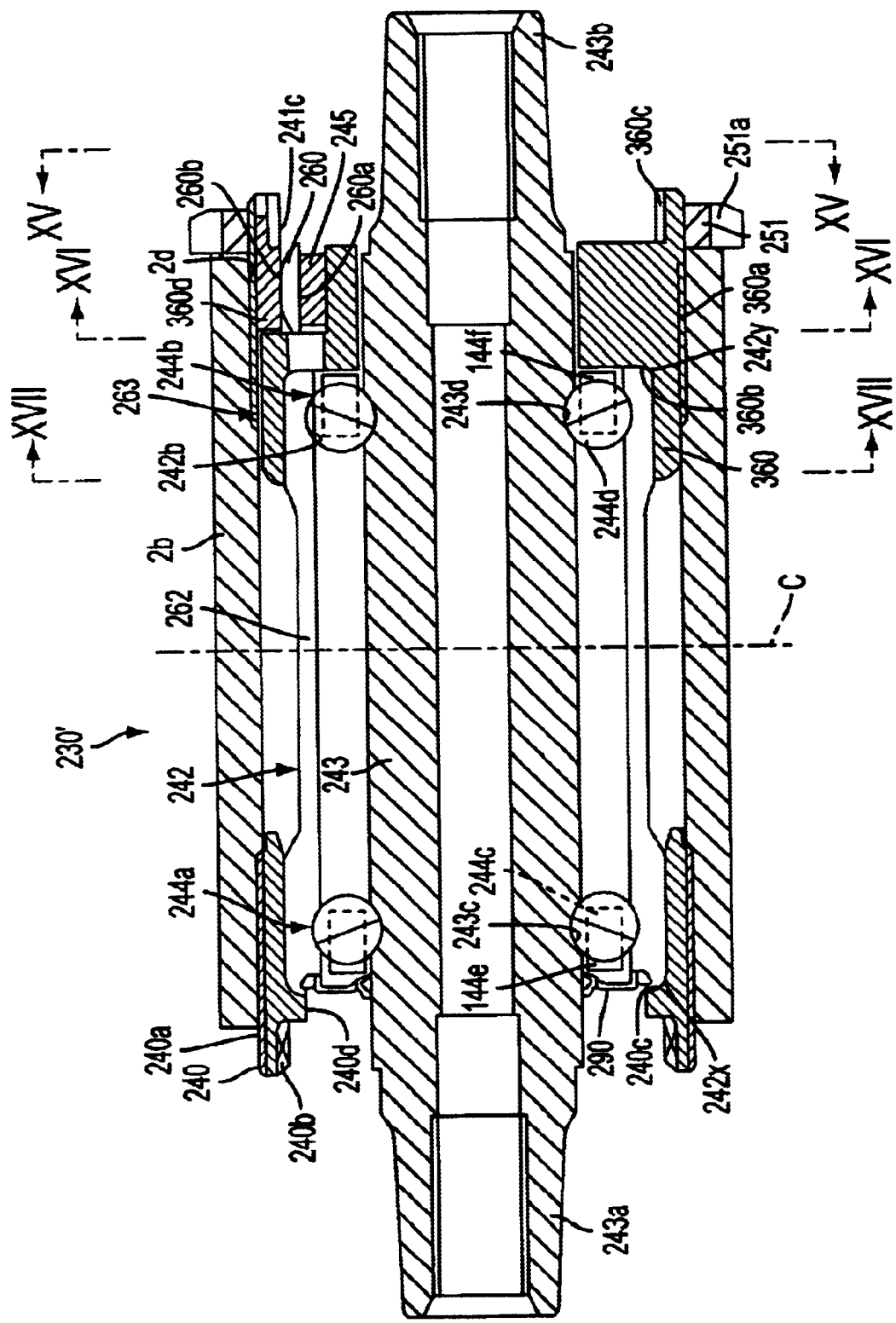
FIG. 14 is a cross sectional view of a particular embodiment of a bottom bracket assembly that incorporates another embodiment of a torque sensor according to the present invention.
Figure 15:
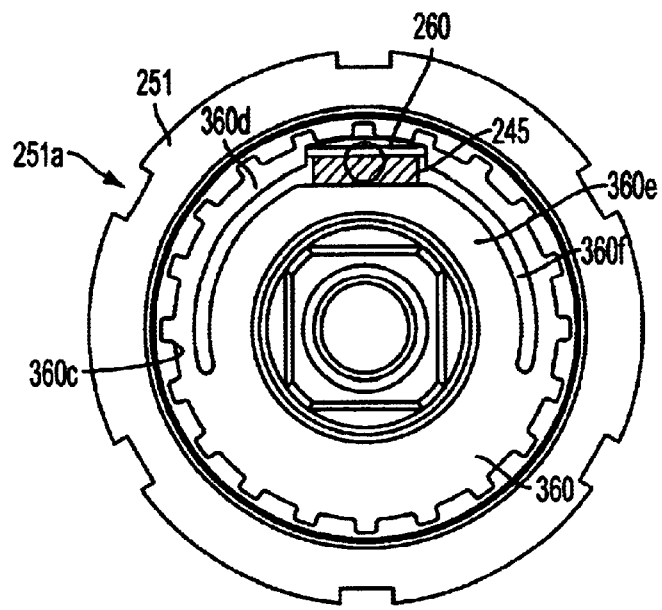
FIG. 15 is a view taken along line XV—XV in FIG. 14.
Figure 16:
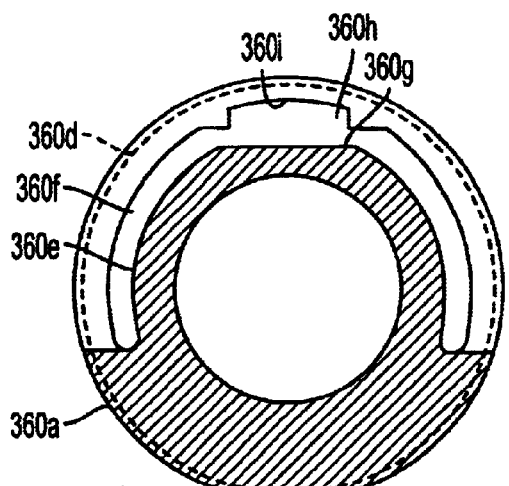
FIG. 16 is a view taken along line XVI—XVI in FIG. 14.
Figure 17:
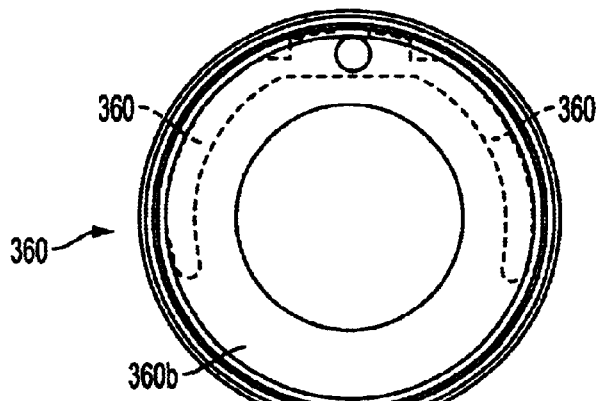
FIG. 17 is a view taken along line XVII—XVII in FIG. 14.

FIG. 14 is a cross sectional view of a particular embodiment of a bottom bracket assembly 230' that incorporates another embodiment of a torque sensor according to the present invention; FIG. 15 is a view taken along line XV—XV in FIG. 14; FIG. 16 is a view taken along line XVI—XVI in FIG. 14; and FIG. 17 is a view taken along line XVII—XVII in FIG. 14. This embodiment is similar to the embodiment shown in FIGS. 12 and 13, so identical components are numbered the same. Bottom bracket axle assembly 230' differs from bottom bracket axle assembly 230 shown in FIGS. 12 and 13 in that right-side tubular member 241 and sensor mounting member 263 are formed into a one-piece sensor mounting tubular member 360.

In this case sensor mounting tubular member 360 has a threaded outer peripheral surface 360a that engages threaded inner peripheral surface 2d of bottom bracket 2b, a concave inner peripheral surface 360b that abuts against convex end 242y of bearing housing 242 to position bearing housing 242 in bottom bracket 2b, and a plurality of splines 360c for engaging a screw-in tool at the right-side inner peripheral surface. An arcuate sensor retaining portion 360d (FIG. 16) is spaced apart from a central portion 360e for forming an arcuate space 360f. Central portion 360e has a surface 360g that is flat in the axial and circumferential directions, and pressure sensor 245 is placed on this flat surface 360g. Sensor retaining portion 360d has a concave cavity 360h with a surface 360i that is flat in the axial and radial directions for contacting the upper surface 260b of sensor pressing member 260. The operation and advantages are the same as with the embodiment shown in FIGS. 12 and 13 except that this embodiment also is simpler to assemble because of the one-piece sensor mounting tubular member 360.

As with the above embodiments, the pressure sensor 245 preferably is disposed on the side opposite the direction of travel of the bicycle, that is, in the rear section of the bearing housing 242. Although only one pressure sensor 245 is shown located on the right-side of bottom bracket axle assembly 230', a second pressure sensor and accompanying components similar to that shown for the right-side of bottom bracket assembly 230' may be provided on the left-side of bottom-bracket axle assembly 230' and mounted on the front side of bottom bracket axle assembly 230' similar to the embodiments shown in FIGS. 3, 7 and 8.

Figure 18:
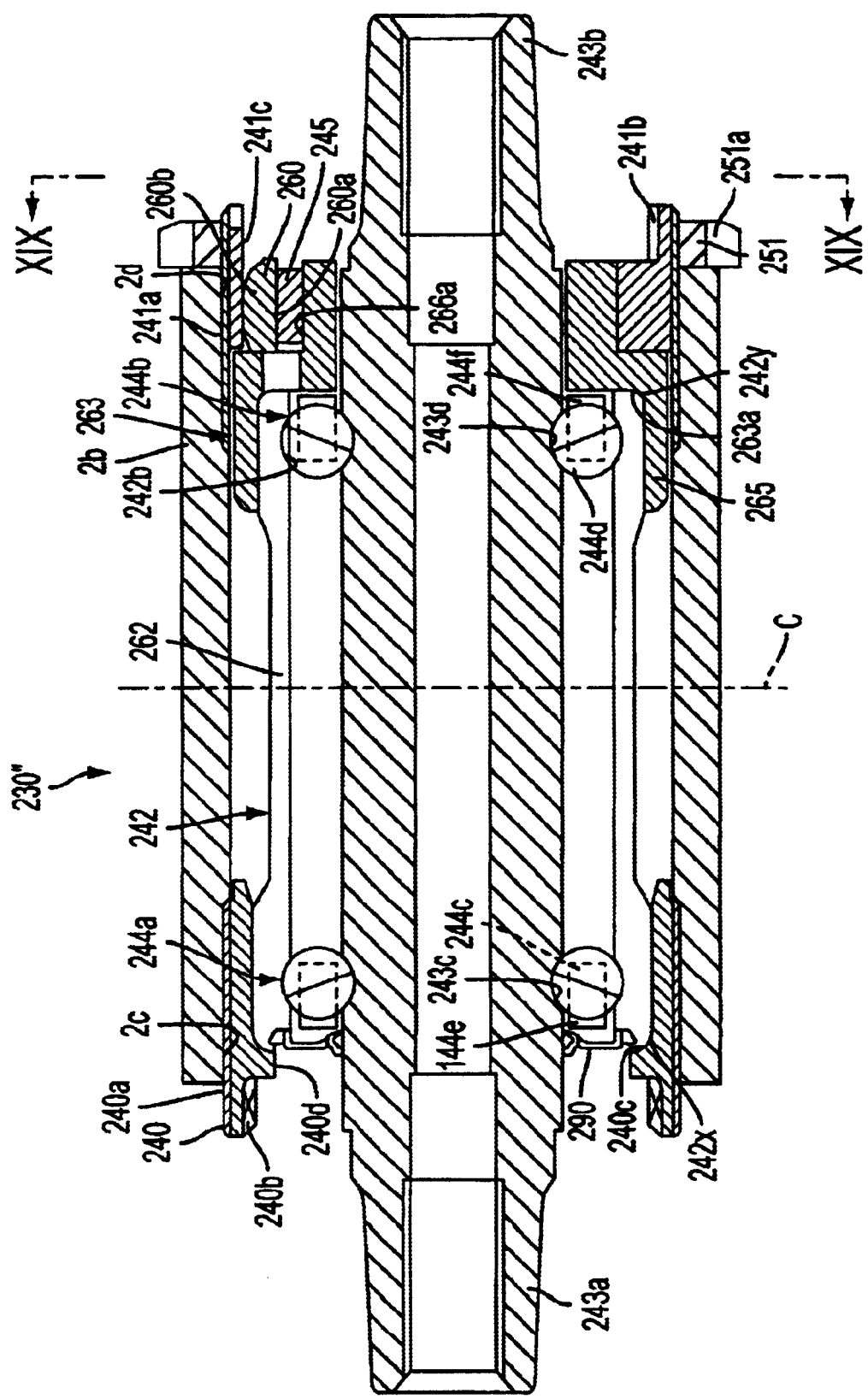
FIG. 18 is a cross sectional view of a particular embodiment of a bottom bracket assembly that incorporates another embodiment of a torque sensor according to the present invention.
Figure 19:
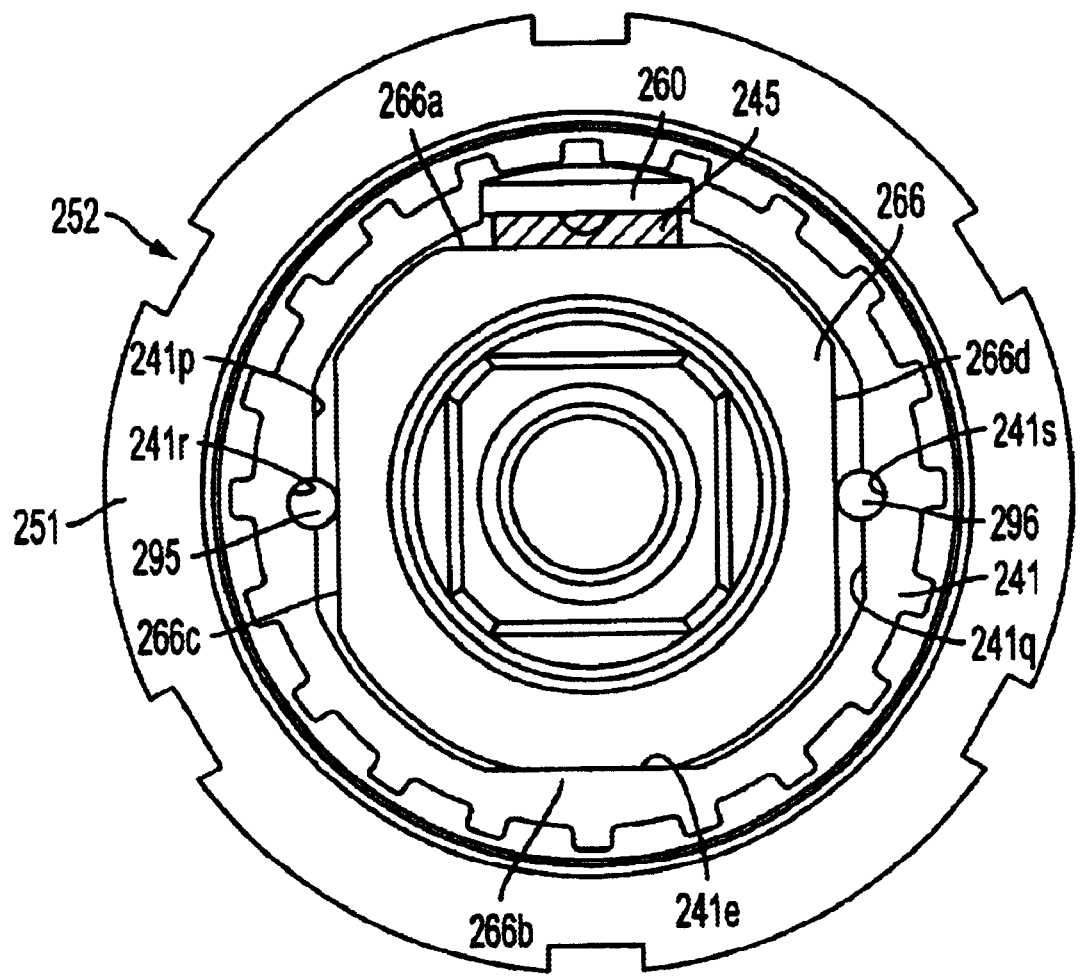
FIG. 19 is a view taken along line XIX—XIX in FIG. 18.

FIG. 18 is a cross sectional view of a particular embodiment of a bottom bracket assembly 230" that incorporates another embodiment of a torque sensor according to the present invention, and FIG. 19 is a view taken along line XIX—XIX in FIG. 18. This embodiment is similar to the embodiment shown in FIGS. 12 and 13, so identical components are numbered the same. Bottom bracket axle assembly 230" differs from bottom bracket axle assembly 230 shown in FIGS. 12 and 13 in that flat surfaces 241f and 241g of right-side cylindrical member 241 in that embodiment have been replaced by curved surfaces 241p and 241q with corresponding bearing recesses 241r and 241s, and rollers in the form of ball bearings 295 and 296 have been placed in bearing recesses 241r and 241s, respectively. Bearings 295 and 296 provide radial support between small diameter sensor mounting portion 266 and right-side cylindrical member 241, but they eliminate the friction inherent in the contacting surfaces 241f, 241g, 266c and 266d shown in FIG. 13. This, in turn, provides a more accurate measure of pressure from pressure sensor 245.

As with the above embodiments, the pressure sensor 245 preferably is disposed on the side opposite the direction of travel of the bicycle, that is, in the rear section of the bearing housing 242. Although only one pressure sensor 245 is shown located on the right-side of bottom bracket axle assembly 230", a second pressure sensor and accompanying components similar to that shown for the right-side of bottom bracket assembly 230" may be provided on the left-side of bottom-bracket axle assembly 230" and mounted on the front side of bottom bracket axle assembly 230" similar to the embodiments shown in FIGS. 3, 7 and 8.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s).

In the embodiments described above, shift timing was controlled based on the torque sensed using the output of a pressure sensor. In the case of a power-assisted bike, however, it is also possible to control motor output for propulsion on the basis of torque. Furthermore, pressure sensors were provided at four positions to improve torque sensing accuracy in the first and second embodiments, but a single pressure sensor may also be used. The mounting position thereof is not limited by the above-described embodiments.

Thus, the scope of the invention should not be limited by the specific structures disclosed or the apparent initial focus on a particular structure or feature.

What is claimed is:

1. A torque sensor for a bicycle bottom bracket assembly having a bottom bracket axle comprising:
   an axle supporting member for supporting the axle for rotation around a support axis, wherein the axle supporting member includes:
   a first sensor mounting location; and
   a second sensor mounting location spaced apart from the first sensor mounting location in the direction of the support axis;
   a first pressure sensor for placement at the first sensor mounting location;
   a second pressure sensor for placement at the second sensor mounting location;

wherein each first pressure sensor and second pressure sensor senses a nonelectromagnetic physical force directed against it from the axle; and wherein the second sensor mounting location is diagonally across from the first sensor mounting location in the direction of the support axis.

2. The torque sensor according to claim 1 wherein the first pressure sensor and the second pressure sensor each comprises a resistance element whose resistance changes in response to a compressive force.

3. The torque sensor according to claim 1 wherein the axle supporting member has an elongated shape extending in the direction of the support axis, wherein the first sensor mounting location is disposed at a first end of the axle supporting member, and wherein the second sensor mounting location is disposed at an opposite second end of the axle supporting member in the direction of the support axis.

4. A torque sensor for a bicycle bottom bracket assembly having a bottom bracket axle comprising:
   an axle supporting member for supporting the axle for rotation around a support axis, wherein the axle supporting member has a first sensor mounting location and a second sensor mounting location spaced apart from the first sensor mounting location in a radial direction of the axle supporting member;
   a first pressure sensor for placement at the first sensor mounting location;
   a second pressure sensor for placement at the second sensor mounting location; and
   wherein each first pressure sensor and second pressure sensor senses a nonelectromagnetic physical force directed against it from the axle.

5. The torque sensor according to claim 4 wherein the second sensor mounting location faces the first sensor mounting location in the radial direction of the axle supporting member.

6. The torque sensor according to claim 5 wherein the first pressure sensor and the second pressure sensor each comprises a resistance element whose resistance changes in response to a compressive force.

7. A torque sensor for a bicycle bottom bracket assembly having a bottom racket axle comprising:
   an axle supporting member for supporting the axle for rotation around a support axis, wherein the axle supporting member includes:
      a first sensor mounting location;
      a second sensor mounting location spaced apart from the first sensor mounting location in the direction of the support axis;
      a third sensor mounting location spaced apart from the first sensor mounting location in a radial direction of the axle supporting member; and
      a fourth sensor mounting location spaced apart from the third sensor mounting location in the direction of the support axis;
   a first pressure sensor for placement at the first sensor mounting location;
   a second pressure sensor for placement at the second sensor mounting location;
   a third pressure sensor for placement at the third sensor mounting location;
   a fourth pressure sensor for placement at the fourth sensor mounting location; and
   wherein each first pressure sensor, second pressure sensor, third pressure sensor and fourth pressure sensor senses a nonelectromagnetic physical force directed against it from the axle.

8. The torque sensor according to claim 7 wherein the second sensor mounting location faces the first sensor mounting location in the direction of the support axis, and wherein the fourth sensor mounting location faces the third sensor mounting location in the direction of the support axis.

9. The torque sensor according to claim 8 wherein the third sensor mounting location faces the first sensor mounting location in the radial direction of the axle supporting member, and wherein the fourth sensor mounting location faces the second sensor mounting location in the radial direction of the axle supporting member.

10. The torque sensor according to claim 9 wherein the first pressure sensor, the second pressure sensor, the third pressure sensor and the fourth pressure sensor each comprises a resistance element whose resistance changes in response to a compressive force.

11. The torque sensor according to claim 9 wherein the axle supporting member has an elongated shape extending in the direction of the support axis, wherein the first sensor mounting location and the third sensor mounting location are disposed at a first end of the axle supporting member, and wherein the second sensor mounting location and the fourth sensor mounting location are disposed at an opposite second end of the axle supporting member in the direction of the support axis.

12. A torque sensor for a bicycle bottom bracket assembly comprising:
   an axle having an axle axis;
   a first bearing including a plurality of first rollers disposed on the axle;
   a second bearing including a plurality of second rollers disposed on the axle;
   wherein the first bearing is spaced apart from the second bearing in a direction of the axle axis;
   a tubular bearing housing surrounding the axle so that the first bearing and the second bearing are disposed between the axle and the bearing housing and so that the axle is rotatably supported in the bearing housing;
   a first tubular member disposed at a first end of the bearing housing;
   a second tubular member disposed at a second end of the bearing housing;
   a first pressure sensor disposed between the first tubular member and the bearing housing; and
   wherein the first pressure sensor senses a nonelectromagnetic physical force directed against it from the axle.

13. A torque sensor for a bicycle bottom bracket assembly comprising:
   an axle having an axle axis;
   a first bearing including a plurality of first rollers disposed on the axle;
   a second bearing including a plurality of second rollers disposed on the axle;
   wherein the first bearing is spaced apart from the second bearing in a direction of the axle axis;
   a tubular bearing housing surrounding the axle so that the first bearing and the second bearing are disposed between the axle and the bearing housing and so that the axle is rotatably supported in the bearing housing;
   a first tubular member disposed at a first end of the bearing housing;
   a second tubular member disposed at a second end of the bearing housing;
   a first pressure sensor disposed between the first tubular member and the bearing housing;

wherein the first pressure sensor senses a physical force directed against it from the axle;

wherein the first tubular member is disposed about an outer peripheral surface of the bearing housing, and wherein the first pressure sensor is disposed between an inner peripheral surface of the first tubular member and the outer peripheral surface of the bearing housing so that the first pressure sensor senses physical forces applied to it from between the tubular member and the bearing housing.

14. The torque sensor according to claim 13 wherein the first pressure sensor comprises a first resistance element whose resistance changes in response to a compressive force.

15. The torque sensor according to claim 12 further comprising a second pressure sensor disposed between the second tubular member and the bearing housing.

16. A torque sensor for a bicycle bottom bracket assembly comprising:

an axle having an axle axis;

a first bearing including a plurality of first rollers disposed on the axle;

a second bearing including a plurality of second rollers disposed on the axle;

wherein the first bearing is spaced apart from the second bearing in a direction of the axle axis;

a tubular bearing housing surrounding the axle so that the first bearing and the second bearing are disposed between the axle and the bearing housing and so that the axle is rotatably supported in the bearing housing;

a first tubular member disposed at a first end of the bearing housing;

a second tubular member disposed at a second end of the bearing housing;

a first pressure sensor disposed between the first tubular member and the bearing housing;

a second pressure sensor disposed between the second tubular member and the bearing housing;

wherein the first pressure sensor and the second pressure sensor sense physical forces directed against them from the axle;

wherein the first tubular member is disposed about an outer peripheral surface of the bearing housing;

wherein the second tubular member is disposed about the outer peripheral surface of the bearing housing;

wherein the first pressure sensor is disposed between an inner peripheral surface of the first tubular member and the outer peripheral surface of the bearing housing;

wherein the second pressure sensor is disposed between an inner peripheral surface of the second tubular member and the outer peripheral surface of the bearing housing;

wherein the first pressure sensor senses physical forces applied to it from between the first tubular member and the bearing housing; and wherein the second pressure sensor senses physical forces applied to it from between the second tubular member and the bearing housing.

17. The torque sensor according to claim 16 wherein the first pressure sensor and the second pressure sensor each comprises a resistance element whose resistance changes in response to a compressive force.

18. The torque sensor according to claim 16 wherein the bearing housing includes:

a first depression; and a second depression;

wherein the first pressure sensor is mounted immovably in the first depression; and wherein the second pressure sensor is mounted immovably in the second depression.

19. The torque sensor according to claim 18 wherein the first pressure sensor and the second pressure sensor each comprises an arcuate plate-shaped member.

20. The torque sensor according to claim 18 wherein the first pressure sensor is mounted radially outwardly from the first bearing, and wherein and the second pressure sensor is mounted radially outwardly of the second bearing.

21. The torque sensor according to claim 16 wherein the first pressure sensor faces the second pressure sensor in a direction of the axle axis.

22. The torque sensor according to claim 16 wherein the first pressure sensor is dispose diagonally across from the second pressure sensor in the direction of the axle axis.

23. The torque sensor according to claim 16 further comprising:

a third pressure sensor disposed between the inner peripheral surface of the first tubular member and the outer peripheral surface of the bearing housing;

a fourth pressure sensor disposed between the inner peripheral surface of the second tubular member and the outer peripheral surface of the bearing housing;

wherein the third pressure sensor faces the first pressure sensor in a radial direction of the bearing housing; and wherein the fourth pressure sensor faces the second pressure sensor in the radial direction of the bearing housing.

24. The torque sensor according to claim 23 wherein the first pressure sensor, the second pressure sensor, the third pressure sensor and the fourth pressure sensor each comprises a resistance element whose resistance changes in response to a compressive force.

25. The torque sensor according to claim 23 wherein the bearing housing includes:

first depression;

a second depression;

a third depression; and a fourth depression;

wherein the first pressure sensor is mounted immovably in the first depression;

wherein the second pressure sensor is mounted immovably in the second depression;

wherein the third pressure sensor is mounted immovably in the third depression; and wherein the fourth pressure sensor is mounted immovably in the fourth depression.

26. The torque sensor according to claim 25 wherein the first pressure sensor, the second pressure sensor, the third pressure sensor and the fourth pressure sensor each comprises an arcuate plate-shaped member.

27. The torque sensor according to claim 25 wherein the first pressure sensor and the third pressure sensor are mounted radially outwardly from the first bearing, and wherein and the second pressure sensor and the fourth pressure sensor are mounted radially outwardly from the second bearing.

28. The torque sensor according to claim 15 further comprising:
- a first sensor mounting member having a first sensor mounting location, wherein the first sensor mounting member is disposed between the bearing housing and the first tubular member;
- a second sensor mounting member having a second sensor mounting location, wherein the second sensor mounting member is disposed between the bearing housing and the second tubular member;
- wherein the first pressure sensor is disposed at the first sensor mounting location; and
- wherein the second pressure sensor is disposed at the second sensor mounting location.

29. The torque sensor according to claim 28 wherein the first pressure sensor is disposed diagonally across from the second pressure sensor in the direction of the axle axis.

30. The torque sensor according to claim 15 wherein the second pressure sensor senses a physical force directed against it from the axle.

31. The torque sensor according to claim 23 wherein each second pressure sensor, third pressure sensor and fourth pressure sensor senses a physical force directed against it from the axle.

32. A torque sensor for a bicycle bottom bracket assembly comprising:
- an axle having an axle axis;
- a first bearing including a plurality of first rollers disposed on the axle;
- a second bearing including a plurality of second rollers disposed on the axle;
- wherein the first bearing is spaced apart from the second bearing in a direction of the axle axis;
- a tubular bearing housing surrounding the axle so that the first bearing and the second bearing are disposed between the axle and the bearing housing and so that the axle is rotatably supported in the bearing housing;
- a first tubular member disposed at a first end of the bearing housing;
- a second tubular member disposed at a second end of the bearing housing;
- a first pressure sensor disposed between the first tubular member and the bearing housing;
- wherein the first pressure sensor senses a physical force directed against it from the axle;
- wherein the first tubular member has a threaded outer peripheral surface, and wherein the second tubular member has a threaded outer peripheral surface.

33. The torque sensor according to claim 32 further comprising a locking member threadingly engaging the threaded outer peripheral surface of at least one of the first tubular member and the second tubular member.

34. The torque sensor according to claim 33 wherein the locking member comprises a lock nut.

35. The torque sensor according to claim 34 wherein the locking member fixes a position of the bearing housing relative to the at least one of the first tubular member and the second tubular member in a direction of rotation of the axle.

36. The torque sensor according to claim 33 further comprising a connecting member for axially immovably connecting the bearing housing to the at least one of the first tubular member and the second tubular member threadingly engaged by the locking member.

37. The torque sensor according to claim 33 further comprising a positioning means for fixing a position of the bearing housing relative to the at least one of the first tubular member and the second tubular member threadingly engaged by the locking member in a direction of rotation of the axle.

38. The torque sensor according to claim 33 further comprising a positioning means for fixing a position of the bearing housing relative to the first tubular member and to the second tubular member in a direction of rotation of the axle.

39. The torque sensor according to claim 33 wherein the at least one of the first tubular ember and the second tubular member not threadingly engaged by the locking member has a plurality of depressions and protrusions that engage a corresponding plurality of depressions and protrusions on the bearing housing for fixing a position of the bearing housing relative to the at least one of the first tubular member and the second tubular member in a direction of rotation of the axle.

40. A torque sensor for a bicycle bottom bracket assembly comprising:
- an axle having an axle axis;
- a first bearing including a plurality of first rollers disposed on the axle;
- a second bearing including a plurality of second rollers disposed on the axle;
- wherein the first bearing is spaced apart from the second bearing in a direction of the axle axis;
- a tubular bearing housing surrounding the axle so that the first bearing and the second bearing are disposed between the axle and the bearing housing and so that the axle is rotatably supported in the bearing housing;
- a first tubular member disposed at a first end of the bearing housing;
- a second tubular member disposed at a second end of the bearing housing;
- a pressure sensor disposed between the first tubular member and the bearing housing;
- a sensor mounting member having a sensor mounting location, wherein the sensor mounting member is disposed between the bearing housing and the first tubular member; and
- wherein the pressure sensor is disposed at the sensor mounting location.

41. The torque sensor according to claim 40 wherein the pressure sensor is disposed radially outwardly of the sensor mounting member.

42. The torque sensor according to claim 41 wherein the pressure sensor is disposed on an outer peripheral surface of the sensor mounting member.

43. The torque sensor according to claim 41 further comprising a sensor pressing member disposed between the pressure sensor and the first tubular member.

44. The torque sensor according to claim 43 wherein the sensor pressing member contacts the pressure sensor, and wherein the pressure sensor is disposed on an outer peripheral surface of the sensor mounting member.

45. The torque sensor according to claim 43 wherein the sensor pressing member has an outer peripheral surface tapered in the direction of the axle axis, and wherein the first tubular member has a tapered inner peripheral surface that provides a pressing force towards the tapered outer peripheral surface of the sensor pressing member.

46. The torque sensor according to claim 45 wherein the first tubular member has a threaded outer peripheral surface, and wherein the second tubular member has a threaded outer peripheral surface.

47. The torque sensor according to claim 43 wherein the sensor pressing member has an inner peripheral surface in a shape of a polygon.

48. The torque sensor according to claim 47 wherein the pressure sensor has a flat plate shape, and wherein the inner peripheral surface of the sensor pressing member has a flat side facing the pressure sensor.

49. The torque sensor according to claim 48 wherein the sensor mounting member has an outer peripheral surface in a shape of a polygon, and wherein the outer peripheral surface of the sensor mounting member faces the inner peripheral surface of the sensor pressing member.

50. The torque sensor according to claim 49 wherein the outer peripheral surface of the sensor mounting member has a first flat side facing the pressure sensor.

51. The torque sensor according to claim 50 wherein the sensor mounting member has an out peripheral surface in a shape of an octagon, and wherein the sensor pressing member has an inner peripheral surface in a shape of an octagon.

52. The torque sensor according to claim 51 wherein two flanking sides of the outer peripheral surface of the sensor mounting member adjacent to and flanking the flat side are spaced apart from the inner peripheral surface of the sensor pressing member, and wherein two diametrically opposite spaced sides of the outer peripheral surface of the sensor mounting member diametrically opposite the two flanking sides of the sensor mounting member are spaced apart from the inner peripheral surface of the sensor pressing member.

53. The torque sensor according to claim 52 wherein two diametrically opposite sides of the outer peripheral surface of the sensor mounting member between the two flanking sides of the sensor mounting member and the two diametrically opposite spaced sides of the sensor mounting member contact the inner peripheral surface of the sensor pressing member.

54. The torque sensor according to claim 43 wherein the sensor pressing member includes a slit extending through an outer peripheral surface thereof.

55. The torque sensor according to claim 54 wherein the slit is disposed in close proximity to the pressure sensor.

56. The torque sensor according to claim 53 wherein the sensor pressing member has a curved outer peripheral surface facing an inner peripheral surface of the first tubular member.

57. The torque sensor according to claim 56 wherein the first tubular member has a flat inner peripheral surface facing the sensor pressing member.

58. The torque sensor according to claim 56 wherein the flat inner peripheral surface of the first tubular member contacts the curved outer peripheral surface of the sensor pressing member.

59. The torque sensor according to claim 58 wherein the outer peripheral surface of the sensor pressing member has a rounded shape.

60. The torque sensor according to claim 59 wherein the outer peripheral surface of the sensor pressing member has a constant radius of curvature.

61. The torque sensor according to claim 56 wherein the first tubular member and the sensor mounting member are one-piece.

62. The torque sensor according to claim 56 wherein the sensor mounting member has a first sensor mounting member outer peripheral surface, wherein the first tubular member has a first tubular member inner peripheral surface, and wherein the pressure sensor is disposed between the first sensor mounting member outer peripheral surface and the first tubular member inner peripheral surface.

63. The torque sensor according to claim 62 wherein the sensor mounting member has a second sensor mounting member outer peripheral surface opposite the first sensor mounting member outer peripheral surface, and wherein the first tubular member has a second tubular member inner peripheral surface facing the second sensor mounting member outer peripheral surface.

64. The torque sensor according to claim 63 wherein the second sensor mounting member outer peripheral surface is flat, wherein the second tubular member inner peripheral surface is flat, and wherein the second sensor mounting member outer peripheral surface contacts the second tubular member inner peripheral surface.

65. The torque sensor according to claim 64 wherein the first tubular member and the sensor mounting member are one-piece.

66. The torque sensor according to claim 63 wherein the sensor mounting member has a third sensor mounting member outer peripheral surface opposite a fourth sensor mounting member outer peripheral surface, wherein the third sensor mounting member outer peripheral surface and the fourth sensor member outer peripheral surface are disposed substantially orthogonal to the first sensor mounting member outer peripheral surface and the second sensor member outer peripheral surface.

67. The torque sensor according to claim 66 wherein the first tubular member includes:
 a third tubular member inner peripheral surface facing the third sensor mounting member outer peripheral surface; and
 a fourth tubular member inner peripheral surface facing the fourth sensor mounting member outer peripheral surface.

68. The torque sensor according to claim 67 wherein the third sensor mounting member outer peripheral surface is flat, wherein the third tubular member inner peripheral surface is flat, wherein the fourth sensor mounting member outer peripheral surface is flat, wherein the fourth tubular member inner peripheral surface is flat, wherein the third sensor mounting member outer peripheral surface contacts the third tubular member inner peripheral surface, and wherein the fourth sensor mounting member outer peripheral surface contacts the fourth tubular member inner peripheral surface.

69. The torque sensor according to claim 68 wherein the second sensor mounting member outer peripheral surface is flat, wherein the second tubular member inner peripheral surface is flat, and wherein the second sensor mounting member outer peripheral surface contacts the second tubular member inner peripheral surface.

70. The torque sensor according to claim 66 wherein the first tubular member includes:
 a third tubular member inner peripheral surface facing the third sensor mounting member inner peripheral surface; and
 a fourth tubular member inner peripheral surface facing the fourth sensor mounting member inner peripheral surface.

71. The torque sensor according to claim 70 wherein the third sensor mounting member outer peripheral surface is spaced apart from the third tubular member inner peripheral surface, and wherein the fourth sensor mounting member outer peripheral surface is spaced apart from the fourth tubular member inner peripheral surface.

72. The torque sensor according to claim 71 further comprising:
 a first roller disposed between the third sensor mounting member outer peripheral surface and the third tubular member inner peripheral surface; and
 a second roller disposed between the fourth sensor mounting member outer peripheral surface and the fourth tubular member inner peripheral surface.

73. The torque sensor according to claim 72 wherein the third sensor mounting member outer peripheral surface is flat, and wherein the fourth sensor mounting member outer peripheral surface is flat.

74. The torque sensor according to claim 73 wherein the second sensor mounting member outer peripheral surface is flat, wherein the second tubular member inner peripheral surface is flat, and wherein the second sensor mounting member outer peripheral surface contacts the second tubular member inner peripheral surface.

* * * * *